US012804037B2

(12) United States Patent

Syed et al.

(10) Patent No.: US 12,804,037 B2

(45) Date of Patent: *Nov. 17, 2026

(54) GROUP ACTIVITY SESSION SYNCHRONIZATION

(71) Applicant: Apple Inc., Cupertino, CA (US)

(72) Inventors: Adam Y. Syed, San Francisco, CA (US); Justin R. Etzine, San Jose, CA (US); Pierre J. De Filippis, Los Gatos, CA (US); Nicholas J. Circosta, Mountain View, CA (US); Ryan A. Williams, Morgan Hill, CA (US); David J. Browning, Fair Oaks, CA (US); Chieh Lu, Santa Clara, CA (US); Matthew C. Lucas, Soquel, CA (US); Bhaskar P. Sarma, Sunnyvale, CA (US); Jose A. Lozano Hinojosa, San Jose, CA (US); Sean Geiger, Austin, TX (US); David S. Evans, San Ramon, CA (US); Daniel B. Pollack, Cupertino, CA (US); Priya Shah, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 18/936,522

(22) Filed: Nov. 4, 2024

(65) Prior Publication Data

US 2025/0063086 A1 Feb. 20, 2025

Related U.S. Application Data

(63) Continuation of application No. 18/375,454, filed on Sep. 29, 2023, now Pat. No. 12,160,472.

(60) Provisional application No. 63/443,011, filed on Feb. 2, 2023.

(51) Int. Cl.

*G06F 15/16* (2006.01)
*H04L 67/1095* (2022.01)
*H04L 67/142* (2022.01)

(52) U.S. Cl.

CPC ........ *H04L 67/1095* (2013.01); *H04L 67/142* (2013.01)

(58) Field of Classification Search

None

See application file for complete search history.

(56) References Cited

U.S. PATENT DOCUMENTS

2006/0004911 A1 1/2006 Becker et al.
2007/0081644 A1 4/2007 Jachner
2007/0239869 A1* 10/2007 Raghav ................ H04L 51/043 709/224
2007/0276937 A1 11/2007 Chavda et al.
2007/0291761 A1 12/2007 Kauniskangas et al.
2017/0104831 A1 4/2017 Fransen (Continued)

OTHER PUBLICATIONS

U.S. Appl. No. 18/520,451; Non-Final Office Action; dated Apr. 30, 2025; 14 pages.

(Continued)

*Primary Examiner* — Quang N Nguyen

*Assistant Examiner* — Andrew Woo

(74) *Attorney, Agent, or Firm* — BakerHostetler; Kyle B. Morse

(57) ABSTRACT

The present disclosure generally relates to synchronizing copies of a data object.

30 Claims, 9 Drawing Sheets

(56) References Cited

U.S. PATENT DOCUMENTS

| | | | |
|---|---|---|---|
| 2018/0124136 | A1 | 5/2018 | Faulkner et al. |
| 2022/0109651 | A1* | 4/2022 | Leigh ...................... H04L 51/18 |

OTHER PUBLICATIONS

U.S. Appl. No. 19/285,861; Non-Final Office Action; dated Apr. 10, 2026; 8 pages.

* cited by examiner

| Permitted Device | User |
|---|---|
| First Device | A |
| Second Device | B |
| Third Device | B |
| Fourth Device | C |

GROUP ACTIVITY SESSION SYNCHRONIZATION

CROSS-REFERENCE TO RELATED APPLICATIONS

This application is a continuation application of U.S. Non-Provisional patent application Ser. No. 18/375,454, entitled “GROUP ACTIVITY SESSION SYNCRHONIZATION”, filed Sep. 29, 2023, which claims priority to U.S. Provisional Patent Application No. 63/443,011, entitled “GROUP ACTIVITY SESSION SYNCRHONIZATION”, and filed on Feb. 2, 2023, which are incorporated by reference herein in their entireties.

BACKGROUND

Electronic devices are becoming increasingly interconnected. For example, devices are increasingly used to collaborate with each other to create and edit a data object (e.g., content represented as a file). Such collaboration can occur in different ways, including some where multiple devices are simultaneous editing the data object and some where only a single device is editing data the data object at a time. Managing synchronization of copies of the data object (e.g., at each device and/or a storage resource) for each scenario can be a complex challenge. Accordingly, there is a need to improve techniques for synchronizing copies of a data object for supporting collaboration during group activity sessions with respect to a data object.

SUMMARY

Current techniques for synchronizing copies of a data object are generally ineffective and/or inefficient. For example, some techniques require synchronization that is unnecessarily frequent, which can have a negative effect on device resources. Some techniques are not sufficiently dynamic to account for activity and do not synchronize frequently enough, which can lead to errors and degraded user experience. In some examples, this disclosure provides more effective and/or efficient techniques for synchronizing copies of a data object using synchronization settings (e.g., rate and/or number of data channels) that can dynamically react based on device activity in a group activity session. It should be recognized that many types of electronic devices can be used with techniques described herein. For example, a smartphone can synchronize with a laptop using techniques described herein. In addition, techniques optionally complement or replace other techniques for communication between electronic devices.

Some techniques are described herein for synchronizing copies of a data object. Summaries of such techniques, in accordance with some examples, are included below.

In some embodiments, a method that is performed by a first electronic device is described. In some embodiments, the method comprises: joining an activity session associated with a data object; while joined to the activity session: synchronizing, using a first data transfer channel, a copy of the data object with a storage resource; receiving an indication that a second electronic device has joined the activity session associated with the data object; and subsequent to receiving the indication that the second electronic device has joined the activity session: establishing a second data transfer channel; and synchronizing, using the second data transfer channel, a copy of the data object with the second electronic device while continuing to synchronize, using the first data transfer channel, the copy of the data object with the storage resource.

In some embodiments, a non-transitory computer-readable storage medium storing one or more programs configured to be executed by one or more processors of a first electronic device is described. In some embodiments, the one or more programs includes instructions for: joining an activity session associated with a data object; while joined to the activity session: synchronizing, using a first data transfer channel, a copy of the data object with a storage resource; receiving an indication that a second electronic device has joined the activity session associated with the data object; and subsequent to receiving the indication that the second electronic device has joined the activity session: establishing a second data transfer channel; and synchronizing, using the second data transfer channel, a copy of the data object with the second electronic device while continuing to synchronize, using the first data transfer channel, the copy of the data object with the storage resource.

In some embodiments, a transitory computer-readable storage medium storing one or more programs configured to be executed by one or more processors of a first electronic device is described. In some embodiments, the one or more programs includes instructions for: joining an activity session associated with a data object; while joined to the activity session: synchronizing, using a first data transfer channel, a copy of the data object with a storage resource; receiving an indication that a second electronic device has joined the activity session associated with the data object; and subsequent to receiving the indication that the second electronic device has joined the activity session: establishing a second data transfer channel; and synchronizing, using the second data transfer channel, a copy of the data object with the second electronic device while continuing to synchronize, using the first data transfer channel, the copy of the data object with the storage resource.

In some embodiments, a first electronic device is described. In some embodiments, the first electronic device comprises one or more processors and memory storing one or more program configured to be executed by the one or more processors. In some embodiments, the one or more programs includes instructions for: joining an activity session associated with a data object; while joined to the activity session: synchronizing, using a first data transfer channel, a copy of the data object with a storage resource; receiving an indication that a second electronic device has joined the activity session associated with the data object; and subsequent to receiving the indication that the second electronic device has joined the activity session: establishing a second data transfer channel; and synchronizing, using the second data transfer channel, a copy of the data object with the second electronic device while continuing to synchronize, using the first data transfer channel, the copy of the data object with the storage resource.

In some embodiments, a first electronic device is described. In some embodiments, the first electronic device includes: means for joining an activity session associated with a data object; while joined to the activity session: means for synchronizing, using a first data transfer channel, a copy of the data object with a storage resource; means for receiving an indication that a second electronic device has joined the activity session associated with the data object; and subsequent to receiving the indication that the second electronic device has joined the activity session: means for establishing a second data transfer channel; and means for synchronizing, using the second data transfer channel, a copy of the data object with the second electronic device while continuing to synchronize, using the first data transfer channel, the copy of the data object with the storage resource.

In some embodiments, a computer program product is described. In some embodiments, the computer program product comprises one or more programs configured to be executed by one or more processors of a first electronic device. In some embodiments, the one or more programs includes instructions for: joining an activity session associated with a data object; while joined to the activity session: synchronizing, using a first data transfer channel, a copy of the data object with a storage resource; receiving an indication that a second electronic device has joined the activity session associated with the data object; and subsequent to receiving the indication that the second electronic device has joined the activity session: establishing a second data transfer channel; and synchronizing, using the second data transfer channel, a copy of the data object with the second electronic device while continuing to synchronize, using the first data transfer channel, the copy of the data object with the storage resource.

In some embodiments, a method that is performed by a first electronic device is described. In some embodiments, the method comprises: while the first electronic device and at least a second electronic device are joined to an activity session associated with a data object: synchronizing, with a remote resource, a copy of the data object using a synchronization setting set to a first synchronization rate; receiving an indication of an activity state of the second electronic device; in response to receiving the indication of the activity state of the second electronic device, determining a second synchronization rate based at least in part on the received indication of the activity state of the second electronic device, wherein the second synchronization rate is different from the first synchronization rate; updating the synchronization setting from the first synchronization rate to the second synchronization rate; and synchronizing, with the remote resource, a copy of the data object using the synchronization setting set to the second synchronization rate.

In some embodiments, a non-transitory computer-readable storage medium storing one or more programs configured to be executed by one or more processors of a first electronic device is described. In some embodiments, the one or more programs includes instructions for: while the first electronic device and at least a second electronic device are joined to an activity session associated with a data object: synchronizing, with a remote resource, a copy of the data object using a synchronization setting set to a first synchronization rate; receiving an indication of an activity state of the second electronic device; in response to receiving the indication of the activity state of the second electronic device, determining a second synchronization rate based at least in part on the received indication of the activity state of the second electronic device, wherein the second synchronization rate is different from the first synchronization rate; updating the synchronization setting from the first synchronization rate to the second synchronization rate; and synchronizing, with the remote resource, a copy of the data object using the synchronization setting set to the second synchronization rate.

In some embodiments, a transitory computer-readable storage medium storing one or more programs configured to be executed by one or more processors of a first electronic device is described. In some embodiments, the one or more programs includes instructions for: while the first electronic device and at least a second electronic device are joined to an activity session associated with a data object: synchronizing, with a remote resource, a copy of the data object using a synchronization setting set to a first synchronization rate; receiving an indication of an activity state of the second electronic device; in response to receiving the indication of the activity state of the second electronic device, determining a second synchronization rate based at least in part on the received indication of the activity state of the second electronic device, wherein the second synchronization rate is different from the first synchronization rate; updating the synchronization setting from the first synchronization rate to the second synchronization rate; and synchronizing, with the remote resource, a copy of the data object using the synchronization setting set to the second synchronization rate.

In some embodiments, a first electronic device is described. In some embodiments, the first electronic device comprises one or more processors and memory storing one or more program configured to be executed by the one or more processors. In some embodiments, the one or more programs includes instructions for: while the first electronic device and at least a second electronic device are joined to an activity session associated with a data object: synchronizing, with a remote resource, a copy of the data object using a synchronization setting set to a first synchronization rate; receiving an indication of an activity state of the second electronic device; in response to receiving the indication of the activity state of the second electronic device, determining a second synchronization rate based at least in part on the received indication of the activity state of the second electronic device, wherein the second synchronization rate is different from the first synchronization rate; updating the synchronization setting from the first synchronization rate to the second synchronization rate; and synchronizing, with the remote resource, a copy of the data object using the synchronization setting set to the second synchronization rate.

In some embodiments, a first electronic device is described. In some embodiments, the first electronic device includes: while the first electronic device and at least a second electronic device are joined to an activity session associated with a data object: means for synchronizing, with a remote resource, a copy of the data object using a synchronization setting set to a first synchronization rate; means for receiving an indication of an activity state of the second electronic device; in response to receiving the indication of the activity state of the second electronic device, means for determining a second synchronization rate based at least in part on the received indication of the activity state of the second electronic device, wherein the second synchronization rate is different from the first synchronization rate; means for updating the synchronization setting from the first synchronization rate to the second synchronization rate; and means for synchronizing, with the remote resource, a copy of the data object using the synchronization setting set to the second synchronization rate.

In some embodiments, a computer program product is described. In some embodiments, the computer program product comprises one or more programs configured to be executed by one or more processors of a first electronic device. In some embodiments, the one or more programs includes instructions for: while the first electronic device and at least a second electronic device are joined to an activity session associated with a data object: synchronizing, with a remote resource, a copy of the data object using a synchronization setting set to a first synchronization rate; receiving an indication of an activity state of the second electronic device; in response to receiving the indication of the activity state of the second electronic device, determining a second synchronization rate based at least in part on the received indication of the activity state of the second electronic device, wherein the second synchronization rate is different from the first synchronization rate; updating the synchronization setting from the first synchronization rate to the second synchronization rate; and synchronizing, with the remote resource, a copy of the data object using the synchronization setting set to the second synchronization rate.

In some embodiments, a method that is performed by a computer system is described. In some embodiments, the method comprises: managing synchronization of one or more copies of a data object during an activity session associated with the data object, wherein a first electronic device and a second electronic device are joined to the activity session, wherein managing synchronization includes: receiving an indication of an activity state of the first electronic device; receiving an indication of an activity state of the second electronic device; in response to receiving the indication of the activity state of the first electronic device, determining a synchronization rate for the second electronic device based at least in part on the received indication of the activity state of the first electronic device; in response to receiving the indication of the activity state of the second electronic device, determining a synchronization rate for the first electronic device based at least in part on the received indication of the activity state of the second electronic device; causing the first electronic device to synchronize at least one of the one or more copies of the data object according to the synchronization rate for the first electronic device; and causing the second electronic device to synchronize at least one of the one or more copies of the data object according to the synchronization rate for the second electronic device.

In some embodiments, a non-transitory computer-readable storage medium storing one or more programs configured to be executed by one or more processors of a computer system is described. In some embodiments, the one or more programs includes instructions for: managing synchronization of one or more copies of a data object during an activity session associated with the data object, wherein a first electronic device and a second electronic device are joined to the activity session, wherein managing synchronization includes: receiving an indication of an activity state of the first electronic device; receiving an indication of an activity state of the second electronic device; in response to receiving the indication of the activity state of the first electronic device, determining a synchronization rate for the second electronic device based at least in part on the received indication of the activity state of the first electronic device; in response to receiving the indication of the activity state of the second electronic device, determining a synchronization rate for the first electronic device based at least in part on the received indication of the activity state of the second electronic device; causing the first electronic device to synchronize at least one of the one or more copies of the data object according to the synchronization rate for the first electronic device; and causing the second electronic device to synchronize at least one of the one or more copies of the data object according to the synchronization rate for the second electronic device.

In some embodiments, a transitory computer-readable storage medium storing one or more programs configured to be executed by one or more processors of a computer system is described. In some embodiments, the one or more programs includes instructions for: managing synchronization of one or more copies of a data object during an activity session associated with the data object, wherein a first electronic device and a second electronic device are joined to the activity session, wherein managing synchronization includes: receiving an indication of an activity state of the first electronic device; receiving an indication of an activity state of the second electronic device; in response to receiving the indication of the activity state of the first electronic device, determining a synchronization rate for the second electronic device based at least in part on the received indication of the activity state of the first electronic device; in response to receiving the indication of the activity state of the second electronic device, determining a synchronization rate for the first electronic device based at least in part on the received indication of the activity state of the second electronic device; causing the first electronic device to synchronize at least one of the one or more copies of the data object according to the synchronization rate for the first electronic device; and causing the second electronic device to synchronize at least one of the one or more copies of the data object according to the synchronization rate for the second electronic device.

In some embodiments, a computer system is described. In some embodiments, the computer system comprises one or more processors and memory storing one or more program configured to be executed by the one or more processors. In some embodiments, the one or more programs includes instructions for: managing synchronization of one or more copies of a data object during an activity session associated with the data object, wherein a first electronic device and a second electronic device are joined to the activity session, wherein managing synchronization includes: receiving an indication of an activity state of the first electronic device; receiving an indication of an activity state of the second electronic device; in response to receiving the indication of the activity state of the first electronic device, determining a synchronization rate for the second electronic device based at least in part on the received indication of the activity state of the first electronic device; in response to receiving the indication of the activity state of the second electronic device, determining a synchronization rate for the first electronic device based at least in part on the received indication of the activity state of the second electronic device; causing the first electronic device to synchronize at least one of the one or more copies of the data object according to the synchronization rate for the first electronic device; and causing the second electronic device to synchronize at least one of the one or more copies of the data object according to the synchronization rate for the second electronic device.

In some embodiments, a computer system is described. In some embodiments, the computer system includes: means for managing synchronization of one or more copies of a data object during an activity session associated with the data object, wherein a first electronic device and a second electronic device are joined to the activity session, wherein means for managing synchronization includes: means for receiving an indication of an activity state of the first electronic device; means for receiving an indication of an activity state of the second electronic device; in response to receiving the indication of the activity state of the first electronic device, means for determining a synchronization rate for the second electronic device based at least in part on the received indication of the activity state of the first electronic device; in response to receiving the indication of the activity state of the second electronic device, means for determining a synchronization rate for the first electronic device based at least in part on the received indication of the activity state of the second electronic device; means for causing the first electronic device to synchronize at least one of the one or more copies of the data object according to the synchronization rate for the first electronic device; and means for causing the second electronic device to synchronize at least one of the one or more copies of the data object according to the synchronization rate for the second electronic device.

In some embodiments, a computer program product is described. In some embodiments, the computer program product comprises one or more programs configured to be executed by one or more processors of a computer system. In some embodiments, the one or more programs includes instructions for: managing synchronization of one or more copies of a data object during an activity session associated with the data object, wherein a first electronic device and a second electronic device are joined to the activity session, wherein managing synchronization includes: receiving an indication of an activity state of the first electronic device; receiving an indication of an activity state of the second electronic device; in response to receiving the indication of the activity state of the first electronic device, determining a synchronization rate for the second electronic device based at least in part on the received indication of the activity state of the first electronic device; in response to receiving the indication of the activity state of the second electronic device, determining a synchronization rate for the first electronic device based at least in part on the received indication of the activity state of the second electronic device; causing the first electronic device to synchronize at least one of the one or more copies of the data object according to the synchronization rate for the first electronic device; and causing the second electronic device to synchronize at least one of the one or more copies of the data object according to the synchronization rate for the second electronic device.

In some embodiments, a method that is performed by a first electronic device is described. In some embodiments, the method comprises: while an activity session, associated with a data object, includes the first electronic device associated with a first user, a second electronic device associated with a second user, and a third electronic device associated with the second user: synchronizing a copy of the data object with the second electronic device using a first synchronization setting set to a first synchronization rate; synchronizing a copy of the data object with the third electronic device using a second synchronization setting set to a second synchronization rate, wherein the second synchronization rate is higher than the first synchronization rate; receiving an indication of an activity state of the third electronic device; in response to receiving the indication of the activity state of the third electronic device, determining a third synchronization rate; updating the first synchronization setting from the first synchronization rate to the third synchronization rate; and synchronizing the copy of the data object with the second electronic device using the first synchronization setting set to the third synchronization rate, wherein the third synchronization rate is higher than the first synchronization rate.

In some embodiments, a non-transitory computer-readable storage medium storing one or more programs configured to be executed by one or more processors of a first electronic device is described. In some embodiments, the one or more programs includes instructions for: while an activity session, associated with a data object, includes the first electronic device associated with a first user, a second electronic device associated with a second user, and a third electronic device associated with the second user: synchronizing a copy of the data object with the second electronic device using a first synchronization setting set to a first synchronization rate; synchronizing a copy of the data object with the third electronic device using a second synchronization setting set to a second synchronization rate, wherein the second synchronization rate is higher than the first synchronization rate; receiving an indication of an activity state of the third electronic device; in response to receiving the indication of the activity state of the third electronic device, determining a third synchronization rate; updating the first synchronization setting from the first synchronization rate to the third synchronization rate; and synchronizing the copy of the data object with the second electronic device using the first synchronization setting set to the third synchronization rate, wherein the third synchronization rate is higher than the first synchronization rate.

In some embodiments, a transitory computer-readable storage medium storing one or more programs configured to be executed by one or more processors of a first electronic device is described. In some embodiments, the one or more programs includes instructions for: while an activity session, associated with a data object, includes the first electronic device associated with a first user, a second electronic device associated with a second user, and a third electronic device associated with the second user: synchronizing a copy of the data object with the second electronic device using a first synchronization setting set to a first synchronization rate; synchronizing a copy of the data object with the third electronic device using a second synchronization setting set to a second synchronization rate, wherein the second synchronization rate is higher than the first synchronization rate; receiving an indication of an activity state of the third electronic device; in response to receiving the indication of the activity state of the third electronic device, determining a third synchronization rate; updating the first synchronization setting from the first synchronization rate to the third synchronization rate; and synchronizing the copy of the data object with the second electronic device using the first synchronization setting set to the third synchronization rate, wherein the third synchronization rate is higher than the first synchronization rate.

In some embodiments, a first electronic device is described. In some embodiments, the first electronic device comprises one or more processors and memory storing one or more program configured to be executed by the one or more processors. In some embodiments, the one or more programs includes instructions for: while an activity session, associated with a data object, includes the first electronic device associated with a first user, a second electronic device associated with a second user, and a third electronic device associated with the second user: synchronizing a copy of the data object with the second electronic device using a first synchronization setting set to a first synchronization rate; synchronizing a copy of the data object with the third electronic device using a second synchronization setting set to a second synchronization rate, wherein the second synchronization rate is higher than the first synchronization rate; receiving an indication of an activity state of the third electronic device; in response to receiving the indication of the activity state of the third electronic device, determining a third synchronization rate; updating the first synchronization setting from the first synchronization rate to the third synchronization rate; and synchronizing the copy of the data object with the second electronic device using the first synchronization setting set to the third synchronization rate, wherein the third synchronization rate is higher than the first synchronization rate.

In some embodiments, a first electronic device is described. In some embodiments, the first electronic device includes: while an activity session, associated with a data object, includes the first electronic device associated with a first user, a second electronic device associated with a second user, and a third electronic device associated with the second user: means for synchronizing a copy of the data object with the second electronic device using a first synchronization setting set to a first synchronization rate; means for synchronizing a copy of the data object with the third electronic device using a second synchronization setting set to a second synchronization rate, wherein the second synchronization rate is higher than the first synchronization rate; means for receiving an indication of an activity state of the third electronic device; in response to receiving the indication of the activity state of the third electronic device, means for determining a third synchronization rate; updating the first synchronization setting from the first synchronization rate to the third synchronization rate; and means for synchronizing the copy of the data object with the second electronic device using the first synchronization setting set to the third synchronization rate, wherein the third synchronization rate is higher than the first synchronization rate.

In some embodiments, a computer program product is described. In some embodiments, the computer program product comprises one or more programs configured to be executed by one or more processors of a first electronic device. In some embodiments, the one or more programs includes instructions for: while an activity session, associated with a data object, includes the first electronic device associated with a first user, a second electronic device associated with a second user, and a third electronic device associated with the second user: synchronizing a copy of the data object with the second electronic device using a first synchronization setting set to a first synchronization rate; synchronizing a copy of the data object with the third electronic device using a second synchronization setting set to a second synchronization rate, wherein the second synchronization rate is higher than the first synchronization rate; receiving an indication of an activity state of the third electronic device; in response to receiving the indication of the activity state of the third electronic device, determining a third synchronization rate; updating the first synchronization setting from the first synchronization rate to the third synchronization rate; and synchronizing the copy of the data object with the second electronic device using the first synchronization setting set to the third synchronization rate, wherein the third synchronization rate is higher than the first synchronization rate.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

Figure 1:
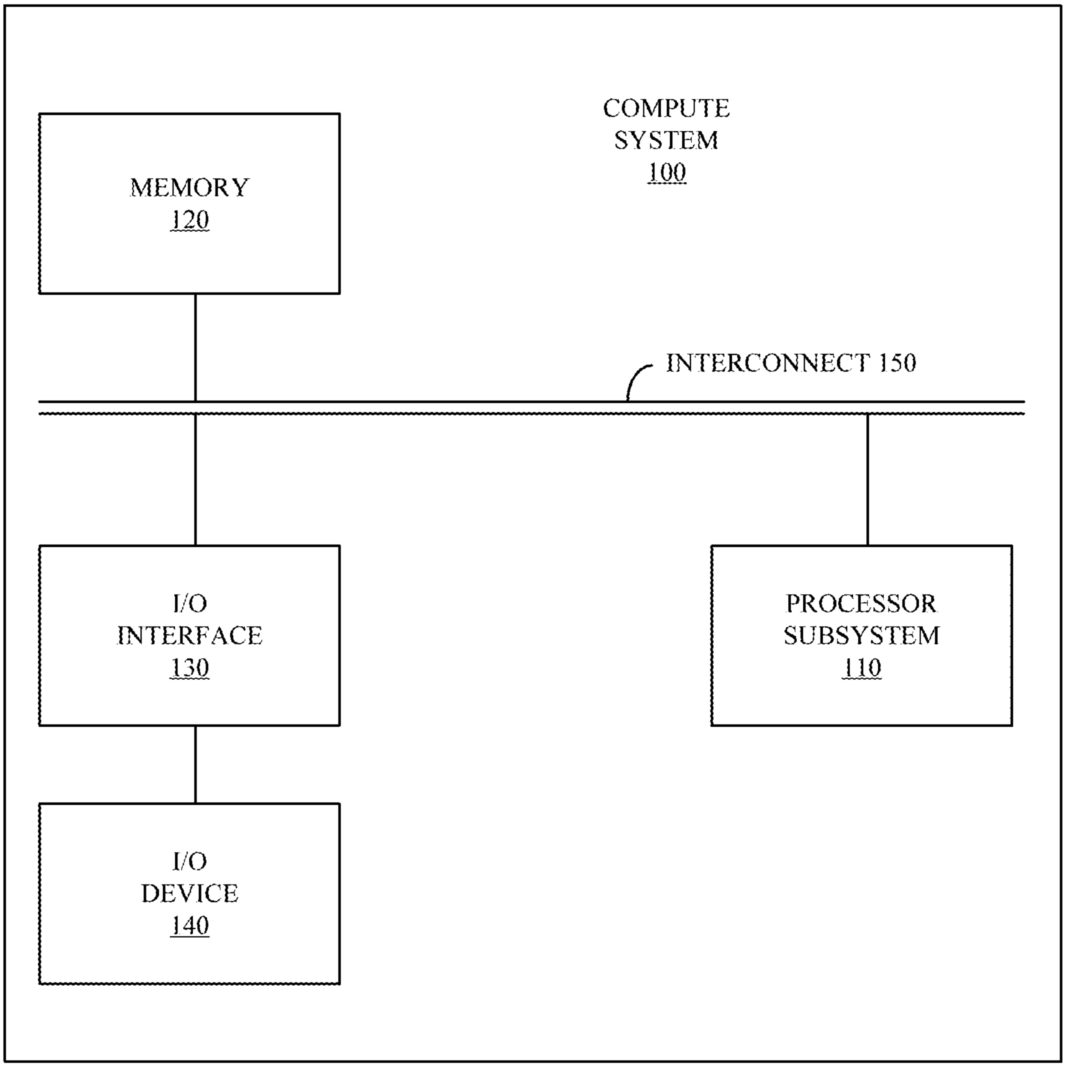
FIG. 1 is a block diagram illustrating a compute system.

The following description sets forth exemplary methods, parameters, and the like. It should be recognized, however, that such description is not intended as a limitation on the scope of the present disclosure but is instead provided as a description of exemplary embodiments.

Methods described herein can include one or more steps that are contingent upon one or more conditions being satisfied. It should be understood that a method can occur over multiple iterations of the same process with different steps of the method being satisfied in different iterations. For example, if a method requires performing a first step upon a determination that a set of one or more criteria is met and a second step upon a determination that the set of one or more criteria is not met, a person of ordinary skill in the art would appreciate that the steps of the method are repeated until both conditions, in no particular order, are satisfied. Thus, a method described with steps that are contingent upon a condition being satisfied can be rewritten as a method that is repeated until each of the conditions described in the method are satisfied. This, however, is not required of system or computer readable medium claims where the system or computer readable medium claims include instructions for performing one or more steps that are contingent upon one or more conditions being satisfied. Because the instructions for the system or computer readable medium claims are stored in one or more processors and/or at one or more memory locations, the system or computer readable medium claims include logic that can determine whether the one or more conditions have been satisfied without explicitly repeating steps of a method until all of the conditions upon which steps in the method are contingent have been satisfied. A person having ordinary skill in the art would also understand that, similar to a method with contingent steps, a system or computer readable storage medium can repeat the steps of a method as many times as needed to ensure that all of the contingent steps have been performed.

Although the following description uses terms "first," "second," etc. to describe various elements, these elements should not be limited by the terms. In some examples, these terms are used to distinguish one element from another. For example, a first subsystem could be termed a second subsystem, and, similarly, a subsystem device could be termed a subsystem device, without departing from the scope of the various described embodiments. In some examples, the first subsystem and the second subsystem are two separate references to the same subsystem. In some examples, the first subsystem and the second subsystem are both subsystems, but they are not the same subsystem or the same type of subsystem.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when," "upon," "in response to determining," "in response to detecting," or "in accordance with a determination that" depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," or "in accordance with a determination that [the stated condition or event]" depending on the context.

Turning to FIG. 1, a block diagram of compute system 100 is illustrated. Compute system 100 is a non-limiting example of a compute system that can be used to perform functionality described herein. It should be recognized that other computer architectures of a compute system can be used to perform functionality described herein.

In the illustrated example, compute system 100 includes processor subsystem 110 communicating with (e.g., wired or wirelessly) memory 120 (e.g., a system memory) and I/O interface 130 via interconnect 150 (e.g., a system bus, one or more memory locations, or other communication channel for connecting multiple components of compute system 100). In addition, I/O interface 130 is communicating with (e.g., wired or wirelessly) to I/O device 140. In some examples, I/O interface 130 is included with I/O device 140 such that the two are a single component. It should be recognized that there can be one or more I/O interfaces, with each I/O interface communicating with one or more I/O devices. In some examples, multiple instances of processor subsystem 110 can be communicating via interconnect 150.

Compute system 100 can be any of various types of devices, including, but not limited to, a system on a chip, a server system, a personal computer system (e.g., a smartphone, a smartwatch, a wearable device, a tablet, a laptop computer, and/or a desktop computer), a sensor, or the like. In some examples, compute system 100 is included or communicating with a physical component for the purpose of modifying the physical component in response to an instruction. In some examples, compute system 100 receives an instruction to modify a physical component and, in response to the instruction, causes the physical component to be modified. In some examples, the physical component is modified via an actuator, an electric signal, and/or algorithm. Examples of such physical components include an acceleration control, a break, a gear box, a hinge, a motor, a pump, a refrigeration system, a spring, a suspension system, a steering control, a pump, a vacuum system, and/or a valve. In some examples, a sensor includes one or more hardware components that detect information about a physical environment in proximity to (e.g., surrounding) the sensor. In some examples, a hardware component of a sensor includes a sensing component (e.g., an image sensor or temperature sensor), a transmitting component (e.g., a laser or radio transmitter), a receiving component (e.g., a laser or radio receiver), or any combination thereof. Examples of sensors include an angle sensor, a chemical sensor, a brake pressure sensor, a contact sensor, a non-contact sensor, an electrical sensor, a flow sensor, a force sensor, a gas sensor, a humidity sensor, an image sensor (e.g., a camera sensor, a radar sensor, and/or a LiDAR sensor), an inertial measurement unit, a leak sensor, a level sensor, a light detection and ranging system, a metal sensor, a motion sensor, a particle sensor, a photoelectric sensor, a position sensor (e.g., a global positioning system), a precipitation sensor, a pressure sensor, a proximity sensor, a radio detection and ranging system, a radiation sensor, a speed sensor (e.g., measures the speed of an object), a temperature sensor, a time-of-flight sensor, a torque sensor, and an ultrasonic sensor. In some examples, a sensor includes a combination of multiple sensors. In some examples, sensor data is captured by fusing data from one sensor with data from one or more other sensors. Although a single compute system is shown in FIG. 1, compute system 100 can also be implemented as two or more compute systems operating together.

In some examples, processor subsystem 110 includes one or more processors or processing units configured to execute program instructions to perform functionality described herein. For example, processor subsystem 110 can execute an operating system, a middleware system, one or more applications, or any combination thereof.

In some examples, the operating system manages resources of compute system 100. Examples of types of operating systems covered herein include batch operating systems (e.g., Multiple Virtual Storage (MVS)), time-sharing operating systems (e.g., Unix), distributed operating systems (e.g., Advanced Interactive eXecutive (AIX), network operating systems (e.g., Microsoft Windows Server), and real-time operating systems (e.g., QNX). In some examples, the operating system includes various procedures, sets of instructions, software components, and/or drivers for controlling and managing general system tasks (e.g., memory management, storage device control, power management, or the like) and for facilitating communication between various hardware and software components. In some examples, the operating system uses a priority-based scheduler that assigns a priority to different tasks that processor subsystem 110 can execute. In such examples, the priority assigned to a task is used to identify a next task to execute. In some examples, the priority-based scheduler identifies a next task to execute when a previous task finishes executing. In some examples, the highest priority task runs to completion unless another higher priority task is made ready.

In some examples, the middleware system provides one or more services and/or capabilities to applications (e.g., the one or more applications running on processor subsystem 110) outside of what the operating system offers (e.g., data management, application services, messaging, authentication, API management, or the like). In some examples, the middleware system is designed for a heterogeneous computer cluster to provide hardware abstraction, low-level device control, implementation of commonly used functionality, message-passing between processes, package management, or any combination thereof. Examples of middleware systems include Lightweight Communications and Marshalling (LCM), PX4, Robot Operating System (ROS), and ZeroMQ. In some examples, the middleware system represents processes and/or operations using a graph architecture, where processing takes place in nodes that can receive, post, and multiplex sensor data messages, control messages, state messages, planning messages, actuator messages, and other messages. In such examples, the graph architecture can define an application (e.g., an application executing on processor subsystem 110 as described above) such that different operations of the application are included with different nodes in the graph architecture.

In some examples, a message sent from a first node in a graph architecture to a second node in the graph architecture is performed using a publish-subscribe model, where the first node publishes data on a channel in which the second node can subscribe. In such examples, the first node can store data in memory (e.g., memory 120 or some local memory of processor subsystem 110) and notify the second node that the data has been stored in the memory. In some examples, the first node notifies the second node that the data has been stored in the memory by sending a pointer (e.g., a memory pointer, such as an identification of a memory location) to the second node so that the second node can access the data from where the first node stored the data. In some examples, the first node would send the data directly to the second node so that the second node would not need to access a memory based on data received from the first node.

Memory 120 can include a computer readable medium (e.g., non-transitory or transitory computer readable medium) usable to store (e.g., configured to store, assigned to store, and/or that stores) program instructions executable by processor subsystem 110 to cause compute system 100 to perform various operations described herein. For example, memory 120 can store program instructions to implement the functionality associated with methods 800, 900, 1000, 11000, 12000, 1300, 1400, and 1500 described below.

Memory 120 can be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, or the like), read only memory (PROM, EEPROM, or the like), or the like. Memory in compute system 100 is not limited to primary storage such as memory 120. Compute system 100 can also include other forms of storage such as cache memory in processor subsystem 110 and secondary storage on I/O device 140 (e.g., a hard drive, storage array, etc.). In some examples, these other forms of storage can also store program instructions executable by processor subsystem 110 to perform operations described herein. In some examples, processor subsystem 110 (or each processor within processor subsystem 110) contains a cache or other form of on-board memory.

I/O interface 130 can be any of various types of interfaces configured to communicate with other devices. In some examples, I/O interface 130 includes a bridge chip (e.g., Southbridge) from a front-side bus to one or more back-side buses. I/O interface 130 can communicate with one or more I/O devices (e.g., I/O device 140) via one or more corresponding buses or other interfaces. Examples of I/O devices include storage devices (hard drive, optical drive, removable flash drive, storage array, SAN, or their associated controller), network interface devices (e.g., to a local or wide-area network), sensor devices (e.g., camera, radar, LiDAR, ultrasonic sensor, GPS, inertial measurement device, or the like), and auditory or visual output devices (e.g., speaker, light, screen, projector, or the like). In some examples, compute system 100 is communicating with a network via a network interface device (e.g., configured to communicate over Wi-Fi, Bluetooth, Ethernet, or the like). In some examples, compute system 100 is directly or wired to the network.

Figure 2:
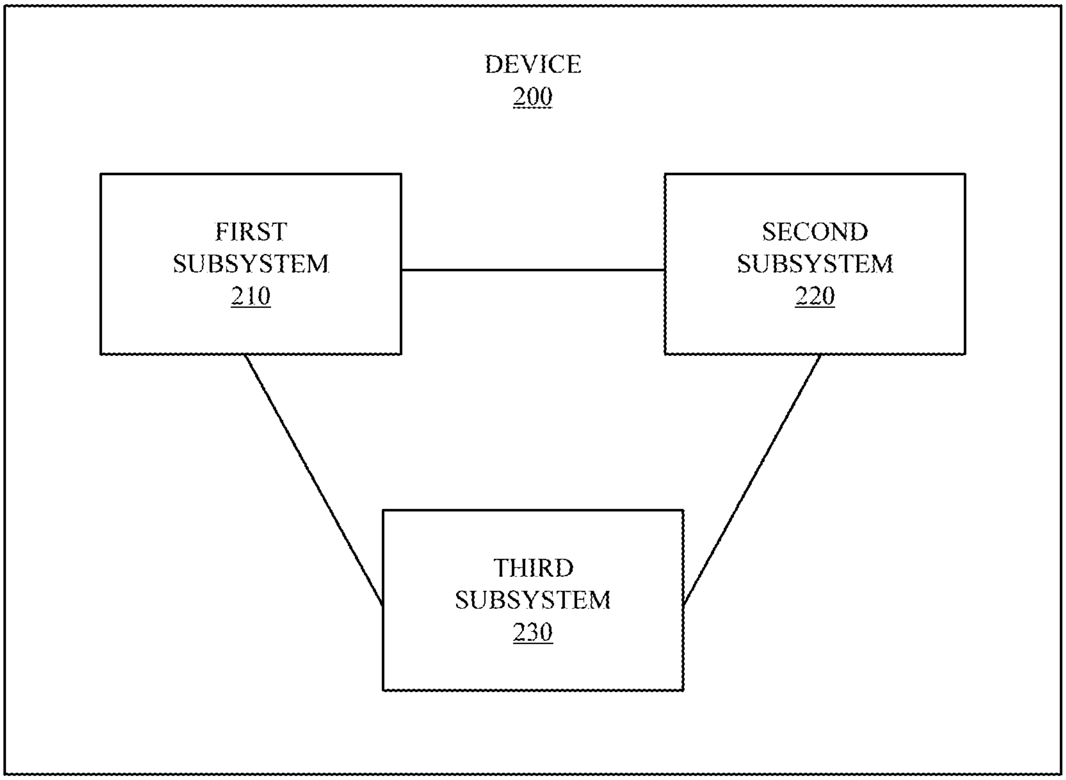
FIG. 2 is a block diagram illustrating a device with interconnected subsystems.

FIG. 2 illustrates a block diagram of device 200 with interconnected subsystems. In the illustrated example, device 200 includes three different subsystems (i.e., first subsystem 210, second subsystem 220, and third subsystem 230) communicating with (e.g., wired or wirelessly) each other, creating a network (e.g., a personal area network, a local area network, a wireless local area network, a metropolitan area network, a wide area network, a storage area network, a virtual private network, an enterprise internal private network, a campus area network, a system area network, and/or a controller area network). An example of a possible computer architecture of a subsystem as included in FIG. 2 is described in FIG. 1 (i.e., compute system 100). Although three subsystems are shown in FIG. 2, device 200 can include more or fewer subsystems.

In some examples, some subsystems are not connected to other subsystem (e.g., first subsystem 210 can be connected to second subsystem 220 and third subsystem 230 but second subsystem 220 cannot be connected to third subsystem 230). In some examples, some subsystems are connected via one or more wires while other subsystems are wirelessly connected. In some examples, messages are set between the first subsystem 210, second subsystem 220, and third subsystem 230, such that when a respective subsystem sends a message the other subsystems receive the message (e.g., via a wire and/or a bus). In some examples, one or more subsystems are wirelessly connected to one or more compute systems outside of device 200, such as a server system. In such examples, the subsystem can be configured to communicate wirelessly to the one or more compute systems outside of device 200.

In some examples, device 200 includes a housing that fully or partially encloses subsystems 210-230. Examples of device 200 include a home-appliance device (e.g., a refrigerator or an air conditioning system), a robot (e.g., a robotic arm or a robotic vacuum), and a vehicle. In some examples, device 200 is configured to navigate (with or without user input) in a physical environment.

In some examples, one or more subsystems of device 200 are used to control, manage, and/or receive data from one or more other subsystems of device 200 and/or one or more compute systems remote from device 200. For example, first subsystem 210 and second subsystem 220 can each be a camera that captures images, and third subsystem 230 can use the captured images for decision making. In some examples, at least a portion of device 200 functions as a distributed compute system. For example, a task can be split into different portions, where a first portion is executed by first subsystem 210 and a second portion is executed by second subsystem 220.

Attention is now directed towards techniques for synchronizing data objects. Such techniques are described in the context of one or more electronic devices performing operations (e.g., edits, modifications, updates) on a data object. It should be recognized that any number or type of electronic device can be used with techniques described herein. For example, a smartphone device can synchronize with a desktop computer device using techniques described herein. In addition, techniques optionally complement or replace other techniques for connecting devices.

Figure 3:
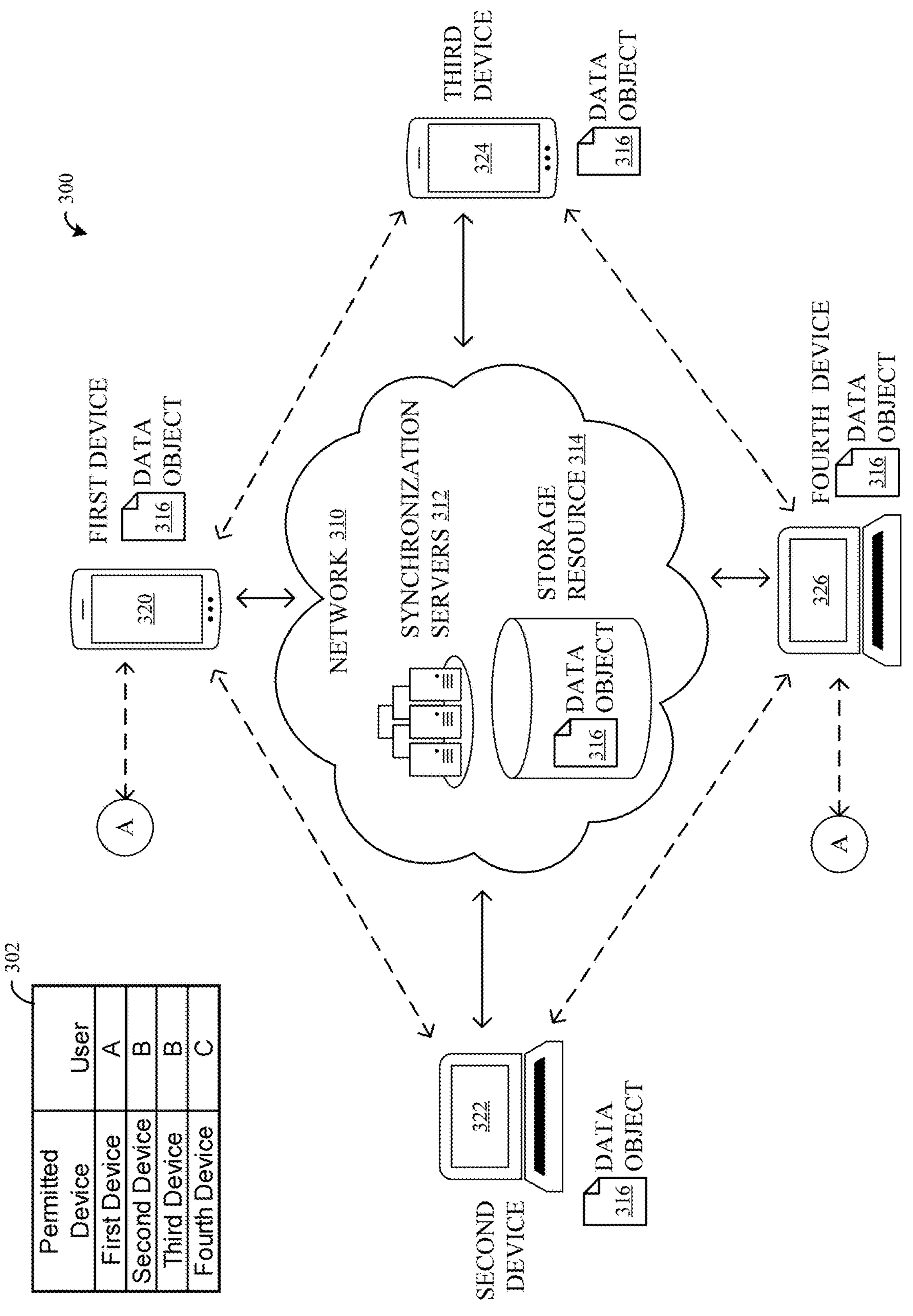
FIG. 3 is a network diagram illustrating systems that are configured to synchronize a copy of a data object in accordance with some examples.
Figure 4:
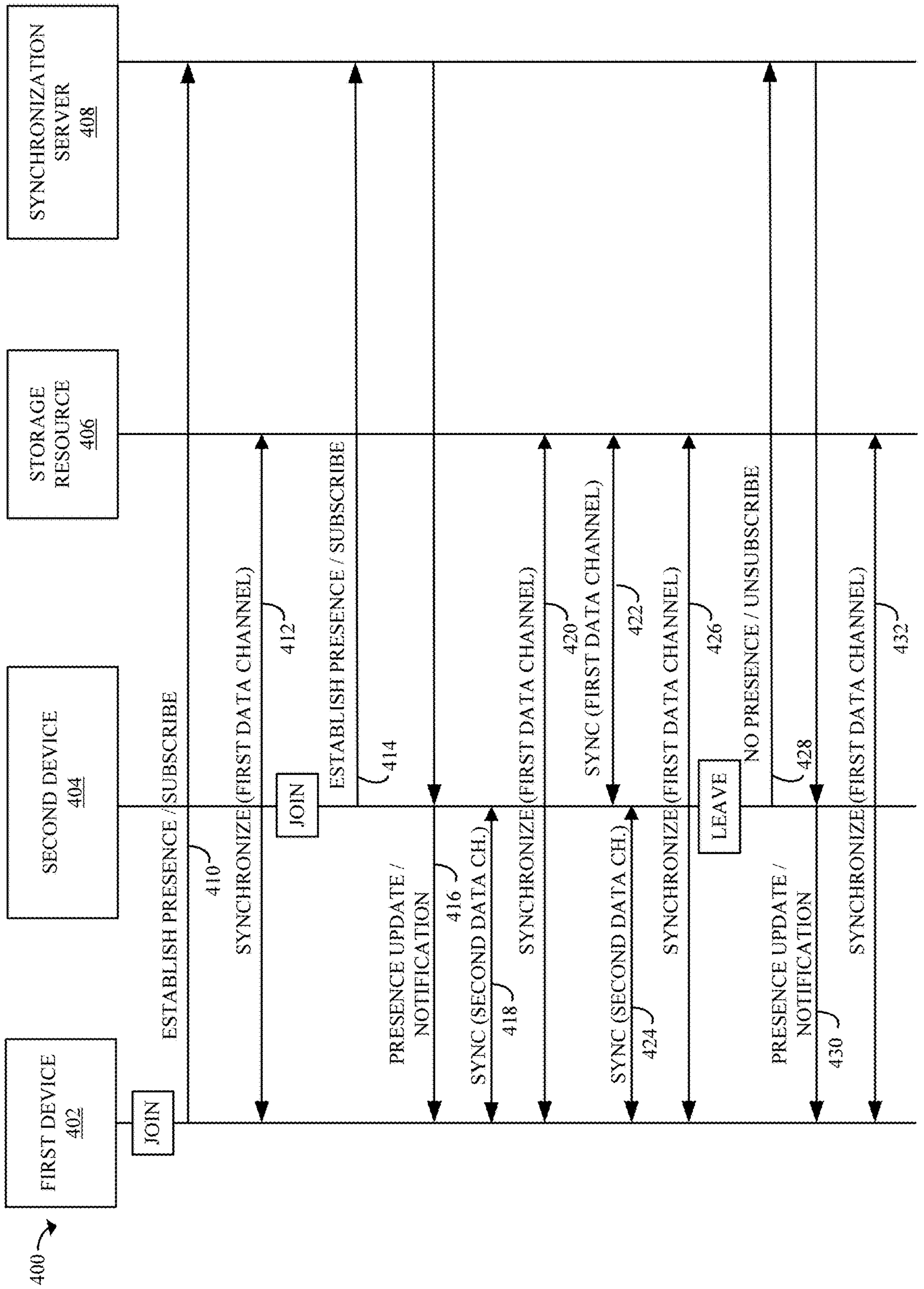
FIG. 4 is communication flow diagram illustrating various example communications that can occur between entities in accordance with some examples.
Figure 5:
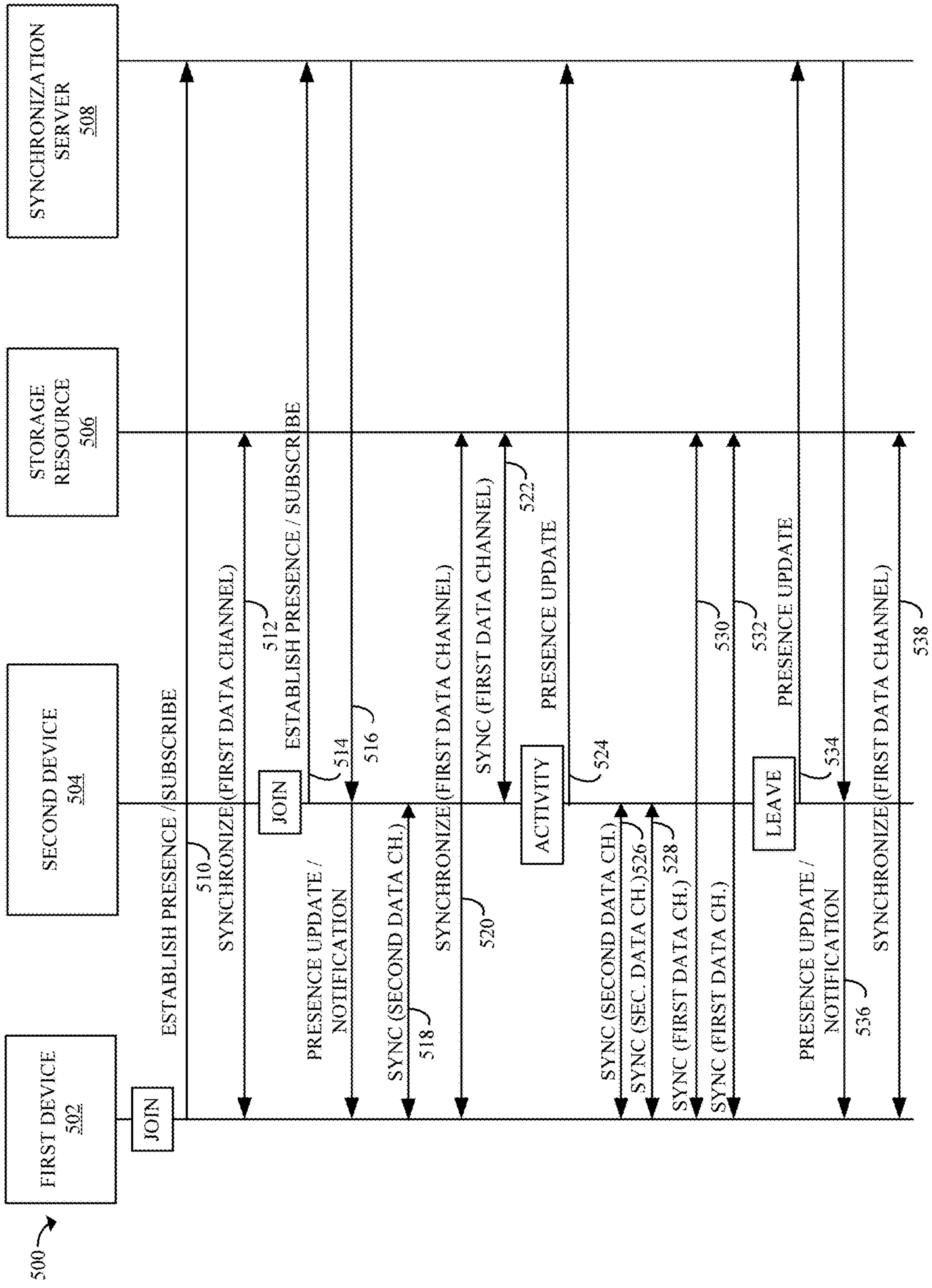
FIG. 5 is communication flow diagram illustrating various example communications that can occur between entities in accordance with some examples.

The examples depicted in and described with respect to FIGS. 3 to 5 illustrate various possible scenarios that involve synchronizing copies of a data object between multiple devices and/or a storage resource. In some examples, a data object is one or more pieces of data that represents content. A non-exhaustive list of examples of a data object, some of which are synonymous, include a file, a document, one or more data structures, a region of storage that stores a group of data/attributes/values that are related and/or linked in some way, and/or any other resource that can be stored and retrieved by a compute system. In some examples, synchronizing copies of a data object (also referred to herein as synchronizing a data object) refers to one or more processes for causing edits to an instance (e.g., a copy) of a data object to be applied to one or more other instances of the data object. In some examples, the instance of the data object is located at the same or a different entity (e.g., device, server, storage resource) from the one or more other instances. Synchronizing can be performed and/or caused to be performed by one or more entities (e.g., synchronization performed at a first device can cause a server to perform a complementary process to relay edits of a data object, and complementary process at a second device to receive and/or provide the edits of the data object). In particular, these examples include multiple devices collaborating to make edits (e.g., also referred to as modifications, changes, updates, or the like) to content. The terms edits, modifications, changes, updates, or other terms that are understood by one of skill to denote changing content of a data object are used interchangeably herein, and the use of any one or more of these terms should not be interpreted as excluding from its scope any other such terms. The content can be stored in persistent storage, such as a storage resource supported by a cloud storage platform (e.g., stored as one or more instances in memory of a server of the cloud storage platform). The content can be accessed by each device (e.g., that has been granted or otherwise has permission, such as due to a logged in user account) and optionally is downloaded as a local copy by each device for saving edits, which are then synchronized (e.g., periodically) between the storage resource and/or other instances of the data object at other devices (e.g., other copies stored at other devices).

The ability of multiple electronic devices and/or users (e.g., user accounts) to access a data object and view and/or make edits to the data object is also referred to herein as "collaboration" with respect to the data object. Collaboration can be performed either while all permitted devices are editing, fewer than all permitted devices are editing, and/or some combination of both (e.g., devices joining and leaving a collaboration session, overlapping in time some of the time). As used herein, a "group activity session" or simply "activity session" with respect to a data object refers to one or more processes and/or operations that use stateful or stateless communication to support exchange of data between two or more devices that are collaborating with respect to a data object.

A group activity session can have certain characteristics and/or be implemented in a manner that has particular benefits. In some examples, each data object (e.g., document) has a different set of members. For example, each data object can have an explicit list of permitted members (e.g., devices and/or users) that can access the data object and/or join (and/or begin) a group activity session for the data object (e.g., and proceed to make edits). In some examples, a group activity session only includes members that are currently present in the data object (also referred to herein as having and/or establishing "presence" in the data object). In some examples, a group activity session is strictly bounded to the single data object. For example, the ability to collaborate can extend to no other data objects and be limited to one or more specifically specified data objects. In some examples, a group activity session is identified and/or otherwise defined using a unique identifier for a data object. For example, each data object (e.g., stored in a storage resource) can be associated with a unique identifier, which is used by members to join and/or launch a group activity session for that data object; the other members can find that group activity session based on the unique identifier. Because different data objects will have different unique identifiers, they will each result in a different group activity session. In some examples, an electronic device and/or user can join multiple group activity sessions at once (e.g., multiple documents can be open at same time, though each will be a separate group activity session). Benefits of this architecture can include that group activities sessions are easy to join and/or setup (e.g., an electronic device already has access to the unique identifier), and/or that the group activity session (and associated services) is not launched unless a data object is accessed, opened, modified, or the like (e.g., no persistent connection that creates communication overhead and/or consumes device resources). In some examples, permission to join a group activity session is provided by an invitation (e.g., an email, addition of user on a permitted list, etc.). In some examples, the invitation is inferred (e.g., an electronic device is provided the unique document identifier, which can be used to join the session).

Synchronizing a data object accessible by multiple devices can be important, for example, because each device can make edits simultaneously and/or close in time. If these edits by different devices are made to different versions of a data object (e.g., because the versions accessed by each different device are out of synchronization (e.g., have not been synchronized recently)), then unfavorable results can occur, such as complex or impossible harmonization of the multiple versions, data errors, and/or unintended loss/deletion of desired edits. Thus, there are benefits to ensuring synchronization occurs as frequently as needed in order to minimize such risks.

However, synchronization can have a cost associated with it. For example, synchronization requires use of communication resources, such as bandwidth. That is, the more frequent synchronization is performed, the more traffic on a network is created. Other costs of synchronization can include increased use of memory, processor time, and/or power consumption (e.g., battery charge usage). Each of these costs can be significant, particularly for battery-operated devices that have limited battery life, devices with limited processing power (e.g., handheld devices such as a smartphone), and/or devices with limited network resources (e.g., those using cellular connectivity). For these reasons, there are benefits to ensuring synchronization occurs intelligently based on a context (e.g., a state of current activity) of collaboration with respect to a data object. When collaboration activity is sufficiently high, there can be faster and/or more frequent synchronization between some or all of the devices and/or resources involved.

Attention is turned to FIGS. 3 to 5, which depict several possible implementations of processes for synchronizing a data object, in accordance with some examples. In these examples, each device has access to a data object that is a document. Examples of a document object include, but are not limited to, a word processor document, a document that stores illustration, a music file, or the like. The data object represents content that can be interacted with and/or modified by a device that access it—for example, add text to a word processor document and/or continue sketching in a document that stores an illustration.

FIG. 3 is an example network diagram 300 of devices that are configured to synchronize a copy of a data object. As indicated in table 302, in this example, a first device 320 is associated with User A, a second device 322 and a third device 324 are associated with a User B, and a fourth device 326 is associated with a User C, wherein Users A, B, and C are different from each other. In this example, first device 320 and third device 324 are each a smartphone, and second device 322 and fourth device 326 are both laptop computers.

Network diagram includes example network 310, which represents one or more interconnected networks used for communication between devices (e.g., the Internet, a wide area network (WAN), a local area network (LAN), some combination of these, and/or the like). Synchronization servers 312 and storage resource 314 are depicted within network 310 to merely illustrate that they can be accessed via (e.g., by communication over) the network 310, and should not be interpreted as necessarily being part of network components and/or hosted by a network provider. Storage resource 314 includes a copy of data object 316. In this example, storage resource 314 represents a persistent storage location for a file represented as data object 316. In this example, the file is a word processer file that is used for collaboration between devices of Users A, B, and C. In some examples, the storage resource (e.g., 314) is the same as, or otherwise a part of, one of the devices (e.g., 320, 322, 324, and/or 326). For example, the persistent storage copy can be locally stored at first device 320, and the user account associated with first device 320 has permitted second device 322, third device 324, and fourth device 326 to join a group activity session for editing the content associated with the data object 316 stored on first device 320.

In some examples, a synchronization server (e.g., of synchronization servers 312) performs one or more functions related to a group activity session for collaborating with respect to a data object. For example, one or more server of synchronization servers 312 can receive communication from a device that serves to establish the device's "presence" in the group activity session. This communication can include an identifier (e.g., unique identifier) of the data object, an indication of an activity state of the device with respect to the data object, a user account associated with the device, and/or a request to subscribe to updates to the data object from other devices and/or user accounts that join and/or are currently part of the group activity session. For example, a group activity session created for a specific data object, is identified by a respective unique identifier. A device (e.g., 320) can send a notification communication to the synchronization server that causes one or more of the following to occur: (1) the synchronization server causes other devices that are also present in the group activity session to be notified of the presence of the newly joined device, and/or (2) the synchronization server causes the newly joined device to be subscribed to notifications related to the group activity session. Regarding (1), this can provide other devices notice that a new device has joined and/or performing a certain type or level of activity with respect to the data object, which can be used to make decisions regarding synchronization (e.g., when more devices are very active, a synchronization rate can be increased and/or a new data channel for synchronization established). Regarding (2), this can allow the newly joined device to keep updated about what other devices are present in the group activity session and/or receive synchronization updates from the other devices.

In some examples, whether an electronic device and/or user is joined to group activity session (and/or what data channels and/or synchronization rates are used) can depend on the presence of the electronic device and/or user. For example, by using the concept of presence, merely opening a document might not be enough to cause a real-time data channel to be established (e.g., which wastes resources if the user then immediately closes the document). A selective process for intelligently updating synchronization is needed, and a system knows when it needs to, for example, upgrade bandwidth for real-time synchronization based on the concept of presence. In some examples, presence is a sliding scale. For example, higher activity can lead to a higher level (e.g., some quantified amount) of presence-which in turn can be used to increase synchronization rate higher than for lower levels of presence.

As shown in FIG. 3, first device 320, second device 322, third device 324, and fourth device 326 can also each include a copy of data object 316, locally stored to save respective edits to memory before being synchronized with other copies. Such synchronization can occur (1) between each device and the other devices, and (2) between each device and storage resource 314. Importantly, there can be many ways that synchronization data is exchanged and/or routed. Several are described here, but the scenarios described here are not intended to be necessarily exhaustive. As shown in network diagram 300, each device (first device 320, second device 322, third device 324, and fourth device 326) communicates via network 310, as represented by the solid-line arrows. This communication can occur with at least one of synchronization servers 312 and/or storage resource 314. In some examples, synchronization servers (e.g., 312) handle (e.g., relay, receive, route, retransmit, or the like) all synchronization requests from a device (e.g., regardless of whether it's a synchronization with another device or with storage resource 314). For example, synchronization servers 312 can act as an intermediary for updates between a device (e.g., 320) and the storage resource 314 and/or between two devices (e.g., 320 and 326). In some examples, a device synchronizes directly with a storage resource (e.g., 314). In some examples, a device synchronizes with another device in a manner that does not use synchronization servers (e.g., 312) as an intermediary. For example, first device 320 and second device 322 establish a data channel between them that uses one or more other servers (such that is bypasses synchronization servers 312).

Regardless of whether communication happens through one or more synchronization servers as an intermediary, network diagram 300 depicts bidirectional communication between each device joined to a group activity session (e.g., dashed-line arrows between each respective pair of the first device 320, the second device 322, the third device 324, and the fourth device 326) in order to illustrate that there is at least an effective communication link between the devices for performing synchronization during the group activity session. In some examples, the communication link is a data channel (also referred to as a "data transfer channel" herein) that is separate than what is used to synchronize with the storage resource (e.g., 314). This 'separate' data channel can utilize one or more synchronization servers as an intermediary or not. This is described more below, for example, with respect to FIGS. 4 and 5. As an example, a first data channel can be used to synchronize with the storage resource, and a second data channel can be established and used for synchronization of updates between members of a group activity session. The second data channel can be established as a result of the synchronization server causing setup of a plugin instance that reliably broadcast messages from one side (e.g., electronic device publishing an update) to the other side (e.g., electronic devices subscribed to updates). The multicast system (e.g., second data channel) multicasts updates to subscribed devices, but a persistence layer (e.g., first data channel) can be used by the first electronic device to synchronize with the persistent copy at the storage resource. This multicast system can be achieved by adding a synchronization server to a communication session (e.g., for communicating over the second data channel) for the group activity session and then distributes it to other members of the session. A pub/sub model (publish and subscribe) can be used to relay messages (e.g., updates, notifications, indications, etc.) between members of the group activity session. In a pub-sub model, a device and/or user sets up a connection to a server and becomes a subscriber to anyone sending updates, and when updates are published all subscribers will receive them. In this scenario, a server does not necessarily know the number of devices present in the group activity session, only the respective devices know. The server can just accept published messages and sends to subscribers (e.g., using a notification server).

It should be noted that while reference is made to synchronization servers 312, there may be only a single synchronization server. Further, synchronization servers 312 can refer to a plurality of servers that each perform a different function with respect to collaboration and/or synchronization. For example, there can be one server that determines presence and manages subscriptions to the group activity session, a separate server that handles pushing presence notifications/updates to members of a group activity, a separate server for data transfer over a data channel used for synchronization, a separate server for managing harmonization of updates to the data object, or the like. The use of the collective phrase "synchronization server" is merely used to represent one or more servers that provide support and/or performs operations for enabling the processes described herein, in accordance with some examples.

FIG. 4 is a communication flow diagram 400 that illustrates various example communications that can occur between entities (e.g., devices, storage resources, servers, or the like). Communication flow diagram 400 includes first device 402 (e.g., first device 320 in FIG. 3), second device 404 (e.g., second device 322 in FIG. 3), storage resource 406 (e.g., storage resource 314 in FIG. 3), and a synchronization server 408 (e.g., synchronization servers 312). The example illustrated by communication flow diagram 400 includes a scenario that includes the first device 402 and the second device 404 joining a group activity session, the first device 402 and the second device 404 establishing and using a second data channel for synchronization, and second device 404 subsequently leaving the group activity session.

Referring to communication flow diagram 400, first device 402 joins a group activity session associated with a data object (e.g., 316). First device 402 can be the first device to join the group activity session, or there can already be other devices joined. In this example, for simplicity of explanation, references to other devices (e.g., third device 324, and/or fourth device 326) are omitted in order to focus explanation on the communication between devices (e.g., the first and second devices), storage resources, and/or synchronization server(s). After joining, at step 410, first device 402 communicates with a synchronization server 408 to establish a presence in the group activity session associated with the data object 316. This communication can also include and/or represent a request to subscribe to any updates related to the group activity session (e.g., from other devices in the session). In some examples, the communication of step 410 is caused by first device 402 performing an action with respect to the data object. In some examples, the action includes opening, requesting, and/or otherwise accessing the data object (e.g., an instance of the data object). For example, first device 402 opens a file. In some examples, the action is a type and/or threshold of activity with respect to the data object. For example, the first device 402 does not initially join the group activity session after opening and viewing the file, but subsequently joins and establishes presence in response to some threshold level, type, and/or amount of activity (and/or another characteristic) upon receiving user input representing edits to the content in the file (e.g., user input of additional text to the word processor document).

At step 412, the first device synchronizes its copy of data object 316 with the copy of the data object (e.g., 316) stored in storage resource 406. For example, the storage resource 406 can be the persistent storage location of data object 316, and first device 402 downloads a local copy in order to open an instance of the file-edits made to the local instance are then synchronized (e.g., sent to) the persistent storage location's copy (e.g., so that when the first device 402 closes the file, the changes are saved in the persistent storage location's copy). In this example, the second device 404 has not joined, so no synchronization occurs between the first device 402 and another device. In some examples, while first device 402 is the only device present in a group activity session, it synchronizes with a storage resource at a first synchronization rate. For example, because no other devices are part of the group activity session, first device 402 can synchronize with storage resource at a relatively low rate (e.g., once per minute). This can allow battery and resource savings without the risk of introducing or increasing data conflict errors between copies of the data object at different devices.

In some examples, a synchronization setting is a set of one or more settings that are configured for synchronization performed by and/or between entities. In some examples, a synchronization setting includes one or more synchronization rates (e.g., applicable in one or more different scenarios and/or counterparties). In some examples, a synchronization rate can be referred to as a synchronization setting. In some examples, a synchronization setting includes a number and/or type of data channel used for synchronization. In some examples, a type of data channel identifies one or more properties of a data transfer channel, one or more properties of a data transfer session (e.g., where multiple sessions can be used simultaneously), a communication protocol, a communication endpoint (e.g., one or more other devices), a communication server (e.g., synchronization server), or similar such information. In some examples, a synchronization rate (also referred to as rate of synchronization or synchronization rate of synchronization) refers to one or both of (1) a frequency of synchronization (e.g., periodically, such as once per minute), and/or (2) a synchronization speed (e.g., using a faster transmission protocol or speed setting). In some examples, synchronization rate includes one or more of a write frequency (e.g., how often updates are output, transmitted, and/or written to a storage resource and/or other device) and/or a read frequency (e.g., how often updates are read from and/or received from a storage resource and/or other device).

Next, the second device 404 joins the group activity session associated with the data object. After joining, at step 414, second device 404 communicates with a synchronization server 408 to establish presence in the group activity session associated with the data object 316. At step 416, the synchronization server 408 communicates with devices subscribed to the group activity session to provide a notification that can include a presence update (e.g., information about the presence of one or more devices in the group activity session). In some examples, the synchronization server 408 acts as an intermediary of messages received from devices. For example, the synchronization server can merely receive a presence update (e.g., 414) and relay it to subscribed devices (e.g., 402 and/or 404), and lack knowledge about which devices are communicating, what the activity/presence is, and/or the content of the data object. This operation as an intermediary by the synchronization server can be referred to as relaying, forwarding, transmitting, mediating, coordinating, or other such similar term, each of which are used interchangeably herein unless otherwise noted. In some examples, an electronic device and/or user does not join and/or establish presence with a server and/or other electronic device until a threshold amount (e.g., level, type) activity is reached (e.g., activity that rises to the level to qualify as presence). The activity of a device and/or user can be referred to as an "activity state" (e.g., the amount of activity at a given time is represented as the device's activity state).

In some examples, synchronization between a device (e.g., 402) and a storage resource (e.g., 406) (e.g., persistent storage) is performed using a first data channel. For example, while first device 402 is the only device joined to the group activity session (which can also just be referred to as an activity session), synchronization is performed periodically but relatively infrequently (e.g., once per minute) with a storage resource 406.

However, the relatively infrequent synchronization rate of the first data channel might not be sufficient to support real-time activity of two different devices actively making edits to the data object at the same time (e.g., both joined to an activity session associated with the data object). In some examples, synchronization between a device (e.g., 402) and another device (e.g., 404) is performed using a second data channel different than the first data channel. The second data channel can be different from the first data channel based on being a different communication path, a different communication protocol, a different communication interface, and/or a different communication session. In some examples, the second data channel is established subsequent to receiving an indication of an activity state of a device. For example, in response to receiving an indication that the second device 404 is present in the activity session (e.g., has the file open and is engaging in a threshold amount or type of activity), the first device 402 establishes a second data channel for synchronizing with the second device 404. In some examples, the second data channel is established in response to an indication that the second electronic device has accessed the data object (e.g., opened the file).

At step 418, the first device 402 synchronizes with the second device 404 using the second data channel. In some examples, synchronizing using the second data channel includes transmitting updates associated with the data object to a synchronization server (e.g., 406). In some examples, the synchronization server receives the updates, determines the other devices that are joined to the group activity session (e.g., and thus subscribed to updates), and relays the updates to the other devices (e.g., and/or all devices that are subscribed). For example, even though step 418 is depicted as a double-ended arrow between first device 402 and second device 404, the second data channel can include communication to and/or via a synchronization server 408. For example, synchronization server 408 can handle receiving updates to the data object in the same or similar way as described above with respect to presence and device activity state—the synchronization server 408 can receive updates to the data object from first device 402 and relay the updates to the devices that are subscribed to updates (e.g., second device 404). This relaying of information regarding updates and/or presence can be configured in a way that the synchronization server does not have any knowledge or visibility into the contents of the updates and/or the data object being updated, but merely acts to simply route updates to relevant devices (e.g., those that are currently present in the group activity session). Notably, step 418 can represent multiple instances of synchronization using the second data channel. For example, because the synchronization of the second data channel can be configured to support real-time collaboration, the first and second devices can synchronize more frequently (e.g., relative to the first data channel) (e.g., synchronize once every five seconds (e.g., 20 times more often than each synchronization over the first data channel at once per minute)). In some examples, synchronization over the second data channel is performed in response to the first device 402 having updates to push to other devices. For example, step 418 can be performed in response to an input that causes a change to the content associated with the data object (e.g., text being typed), and/or according to periodic schedule (e.g., once every five seconds)). In some examples, a synchronization rate using the second data channel is greater than a synchronization rate using the first data channel.

At step 420, the first device 402 synchronizes with the storage resource 406 (e.g., the same or similar to as described above with respect to step 412). For example, the first device 402 continues synchronizing over the first data channel, even while the second data channel is established (e.g., being used periodically for synchronizing). In some examples, subsequent to the first device 402 establishing (or otherwise joining or using) a second data channel, a synchronization rate of the first data channel is modified. For example, once the second data channel is established and being used to support synchronization activity for real-time collaboration, then the synchronization rate of the first data channel (e.g., used to synchronize with the persistent copy at storage resource 406) can be reduced. One reason for this is that the devices, by using the real-time data channel with a faster synchronization rate, are in possession of a more up-to-date copy of the data object, so there is less risk for synchronization errors presented by updating the storage resource (e.g., centralized copy) less often and/or more slowly. In some examples, subsequent to the second device accessing (e.g., opening) a copy of the data object, and prior to the second device establishing presence in the group activity session, a synchronization rate of the first data channel is modified. For example, a second device can open the file for viewing and notify synchronization server that it has accessed the file (and/or to subscribe to updates) but not be performing a threshold amount of activity to cause the second data channel to be established. In such case, the first device 320 can receive an indication (e.g., from synchronization server 408, storage resource 406, and/or second device 404) that the second device 404 has the file open. In response to such notice, the first device 402 can increase a synchronization rate of the first data channel. In this scenario, the real-time data channel has not been established for at least the reason that the second device has not established presence (e.g., interacted to a certain level) with respect to the data object, but because the probability that the second device will establish presence in the near future has increased (e.g., by virtue of opening and viewing the file), the first device 402 proactively increases a synchronization rate to the persistent copy (e.g., that the second device will also be synchronizing with upon accessing the data object from the same storage resource). As noted above, the synchronization rate of the first data channel can subsequently be lowered once the second data channel is established (e.g., back to the original synchronization rate, or to a rate lower than the original synchronization rate). This reduction can, for example, offset the increase in device resources needed to establish, maintain, and/or synchronize using the second data channel. By using the synchronization server and/or notifications with respect to unique data object identifiers, synchronization rates for a particular data channel and/or establishing a new data channel for collaboration can be intelligently and efficiently managed. This can enable real-time collaboration while reducing potential adverse effects on user experience and/or device resources.

At step 422, the second device 404 synchronizes over a first data channel (e.g., in the same or similar manner to as described above with respect to step 412). For example, the second device 404 uses its own first data channel (e.g., not necessarily the same first data channel used by the first device 402 but can be of a same type or mechanism as the first data channel that he first device 402 uses). Similar to as described above for the first device 402, the second device 404 synchronizes using a relatively low synchronization rate (e.g., once per minute) with the persistent copy of the data object (e.g., 316) stored by storage resource 406.

At step 424, the second device 404 synchronizes with the first device 402 using the second data channel (e.g., in the same or similar manner to as described above with respect to step 418). In some examples, synchronizing using the second data channel includes transmitting updates associated with the data object to a synchronization server (e.g., 406). In some examples, the synchronization server receives the updates, determines the other devices that are joined to the group activity session (e.g., and thus subscribed to updates), and relays the updates to the other devices (e.g., and/or all devices that are subscribed). For example, even though step 424 is depicted as a double-ended arrow between first device 402 and second device 404, the second data channel can include communication to and/or via a synchronization server 408. In some examples, communication over the second channel involves multicast transmission to electronic devices that are subscribed to receive communications for the group activity session. In this example, step 424 can be performed in response to one or more of the second device having updates to synchronize with other devices and/or the first device having updates to synchronize with other devices. Step 424 can represent multiple exchanges of synchronization related data.

At step 426, the first device 402 synchronizes with the storage resource 406 (e.g., the same or similar to as described above with respect to steps 412 and/or 420). In some examples, subsequent to the second device 404 establishing (or otherwise joining or using) a second data channel, a synchronization rate of the first data channel (between the second device and the storage resource) is modified. For example, once the second data channel is established and being used to support synchronization activity for real-time collaboration, then the synchronization rate of the first data channel (e.g., used to synchronize with the persistent copy at storage resource 406) can be reduced (and/or be lower than it otherwise would be if the second device was the only device in the group activity session and/or no other device was currently accessing the data object).

After synchronizing at step 426, second device 404 leaves the group activity session (e.g., no longer maintains presence, for reasons such as closing the file represented by the data object and/or becoming idle for a threshold amount of time).

At step 428, second device 404 provides an indication (e.g., via synchronization server 408) that second device 404 is no longer present in the group activity session (e.g., that it has closed the file). In some examples, this indication causes, or includes a request to, unsubscribe the second device 404 from the group activity session updates (e.g., further updates by the first device 402 and/or other devices in the group activity session will not be transmitted to the second device 404). In some examples, the second device 404 is no longer reachable using the second data channel after leaving the group activity session. In some examples, the second device 404 does not provide an indication that it is no longer present, but synchronization server 408 and/or other devices in the group activity session determine that the second device 404 is no longer present due to a timeout (e.g., the second device 404 not affirmatively providing an indication that it is present and/or otherwise active in the activity session).

At step 430, synchronization server 408 communicates with devices subscribed to the group activity session to provide a notification that can include a presence update (e.g., information about the presence of one or more devices in the group activity session) (e.g., the same or similar to as described above with respect to steps 416). For example, the synchronization server 408 relays the second device 404's presence-related update (e.g., of 428) to subscribed devices (e.g., 402 and/or 404) (e.g., which can include or exclude second device 404 depending on how distribution of such messages is implemented).

At step 432, the first device 402 synchronizes with the storage resource 406 (e.g., the same or similar to as described above with respect to steps 412, 420, and/or 426). For example, the first device 402 continues synchronizing with the storage resource 406 after the second device 404 leaves the group activity session. In some examples, the first device 402 ceases to use the second data channel in response to the second device 404 leaving (e.g., and no other devices except the first device 402 remain in the group activity session). For example, if the first device 402 is the only device left in the group activity session, the first device 402 ceases sending updates via the second data channel (e.g., closes or otherwise ends the second data channel). In some examples, the group activity session ends in response to the second device 404 no longer being present. In some examples, the group activity session ends in response to only one electronic device being present. For example, the group activity session can end and the first device 402 can return to editing the file corresponding to the data object and synchronizing with the persistent copy in the storage resource 406 relatively infrequently for at least the reason that real-time synchronization is no longer needed.

FIG. 5 is a communication flow diagram 500 that illustrates various example communications that can occur between entities (e.g., devices, storage resources, servers, or the like). Communication flow diagram 500 includes first device 502 (e.g., first device 320 in FIG. 3 and/or first device 402 in FIG. 4), second device 504 (e.g., second device 322 in FIG. 3 and/or second device 404 in FIG. 4), storage resource 506 (e.g., storage resource 314 in FIG. 3 and/or storage resource 406 in FIG. 4), and a synchronization server 408 (e.g., synchronization servers 312 in FIG. 3 and/or synchronization server 408 in FIG. 4). The example illustrated by communication flow diagram 500 includes a scenario in which the first device 502 and the second device 504 join a group activity session, an update occurs to the activity state of the second device 504 that causes a change in synchronization rate of the first device 502, and second device 504 subsequently leaves the group activity session.

Referring to communication flow diagram 500, first device 502, joins a group activity session associated with a data object (e.g., 316). First device 502 can be the first device to join the group activity session, or there can already be other devices joined. In this example, for simplicity of explanation, references to other devices (e.g., third device 324, and/or fourth device 326) are omitted in order to focus explanation on the communication between devices (e.g., the first and second devices), storage resources, and/or synchronization server(s). After joining, at step 510, first device 502 communicates with synchronization server 508 to establish a presence in the group activity session associated with the data object 316 (e.g., the same or similar manner as described above with respect to step 410). This communication can also include and/or represent a request to subscribe to any updates related to the group activity session (e.g., from other devices in the session). In some examples, the communication of step 510 is caused by the first device 502 performing an action with respect to the data object. In some examples, the action is opening, requesting, or otherwise accessing the data object (e.g., an instance of the data object). For example, first device 502 opens a file. In some examples, the action is a type and/or threshold of activity with respect to the data object. For example, the first device 502 does not initially join the group activity session after opening and viewing the file, but subsequently joins and establishes presence in response to receiving user input representing edits to the content in the file (e.g., user input of additional text to the word processor document).

At step 512, the first device 502 synchronizes its copy of data object 316 with the copy of the of data object 316 stored in storage resource 506 (e.g., the same or similar manner as described above with respect to step 412). In this example, the first device 502 synchronizes with storage resource 506 using a first data channel at a first synchronization rate for the first data channel (e.g., once per minute). For example, the storage resource 506 can be the persistent storage location of data object 316, and first device 502 downloads a copy in order to open a local instance of the file-edits made to the local instance are then synchronized (e.g., sent to) the persistent storage location's copy (e.g., so that when the first device 502 closes the file, the changes are saved in the persistent storage location's copy). In this example, the second device 504 has not joined, so no synchronization occurs between the first device 502 and another device. In some examples, while the first device 502 is the only device present in a group activity session, the first device 502 synchronizes with a storage resource at a first synchronization rate. For example, because no other devices are part of the group activity session, the first device 502 can synchronize with storage resource at a relatively low rate (e.g., once per minute). This can allow battery and resource savings without the risk of introducing or increasing data conflict errors between copies of the data object.

Next, the second device 504 joins the group activity session associated with the data object. After joining, at step 514, second device 504 communicates with a synchronization server 508 to establish a presence in the group activity session associated with the data object 316. At step 516, the synchronization server 508 communicates with devices subscribed to the group activity session to provide a notification that can include a presence update (e.g., information about the presence of one or more devices in the group activity session).

At step 518, the first device 502 synchronizes with the second device 504 using the second data channel at a first synchronization rate for the second data channel (e.g., once per second).

At step 520, the first device 502 synchronizes with the storage resource 506 (e.g., the same or similar to as described above with respect to step 512). In this example, the first device 502 continues to synchronize with the storage resource 506 using the first data channel at the first synchronization rate for the first data channel (e.g., once per minute).

At step 522, the second device (e.g., 504) synchronizes over a first data channel (e.g., in the same or similar manner to as described above with respect to step 512). For example, the second device 322 uses its own first data channel (e.g., not necessarily the same first data channel used by the first device 502 but can be of a same type or mechanism as the first data channel that he first device 502 uses). Similar to as described above for the first device 502 (at steps 512 and 520), the second device 504 synchronizes using a relatively low synchronization rate (e.g., once per minute) with the persistent copy of the data object (e.g., 316) stored by storage resource 506.

After synchronizing at step 522, second device 504 performs some activity that changes its activity state within the group activity session (e.g., increases its editing activity). For example, the second device 504 can begin the frequency of edits to the file associated with the data object. As another example, the second device 504 can begin making edits to a portion of the file that the first device 502 is currently viewing and/or editing.

At step 524, second device 504 provides an indication (e.g., via synchronization server 508) of its updated activity state. In some examples, this indication causes a presence update and/or some notification to be transmitted to devices in the group activity session (e.g., similar to or the same as described with respect to step 516). For example, the synchronization relays the second device 504's presence-related update (e.g., of 524) to subscribed devices (e.g., 502 and/or 504) (e.g., which can include or exclude second device 504 depending on how distribution of such messages is implemented).

In some examples, in response to receiving an indication of an activity state (e.g., change), a device (e.g., first device 502) updates a synchronization rate. For example, first device 502 can increase a synchronization rate of synchronization between first device 502 and second device 504—from the first synchronization rate of the second data channel (e.g., once per second) to a second synchronization rate of the second data channel (e.g., twice per second, therefore doubling the existing first synchronization rate). The first device 502 can also increase a synchronization rate between the first device 502 and a persistent copy of the data object (e.g., with storage resource 506)—from the first synchronization rate of the first data channel (e.g., once per minute) to a second synchronization rate of the first data channel (e.g., twice per minute, therefore doubling the existing first synchronization rate). As shown in communication flow diagram 500, the synchronization rate between the first device 502 and the second device 504 has increased, as represented by an increase in the frequency of synchronization events (depicted as step 526 and step 528) (e.g., occur twice as often compared to before). Also as shown in communication flow diagram 500, the synchronization rate between the first device 502 and the storage resource 506 has increased, as represented by an increase in the frequency of synchronization events (depicted as step 530 and step 532) (e.g., occur twice as often compared to before).

In some examples, the first device 502 communicates with the second device 504 and storage resource 506 using a single data channel. For example, the first device 502 can use the same data channel to synchronize with the second device 504 and the storage resource 506, using either the same or different messages. If synchronizing with different messages (e.g., certain messages are targeted to the storage resource and different certain messages are targeted to the second/other devices that are present), each target recipient of the message (e.g., either the second device, the storage resource, and/or all) can have different synchronization rates. For example, using the same data channel, the first device 502 can synchronize twice as often with the second device 504 (e.g., once per 30 seconds) than with the storage resource (e.g., once per minute). In some examples, the rate of synchronization that is changed in response to the activity state update received from the second device 504 is a synchronization rate set for a target recipient (e.g., second device 504) and/or a set of target recipients (e.g., other devices joined to the group activity session).

After synchronizing at step 532, second device 504 leaves the group activity session (e.g., no longer has presence, for reasons such as closing the file represented by the data object and/or becoming idle for a threshold amount of time).

At step 534, second device 504 provides an indication (e.g., via synchronization server 508) that it is no longer present in the group activity session (e.g., that it has closed the file), or an indication is otherwise received (e.g., based on a timeout for response by second device 504). In some examples, this indication causes or includes a request to unsubscribe the second device 504 from the group activity session updates (e.g., further updates by the first device 502 and/or other devices in the group activity session will not be transmitted to the second device 504).

At step 536, synchronization server 508 communicates with devices subscribed to the group activity session to provide a notification that can include a presence update (e.g., information about the presence of one or more devices in the group activity session) (e.g., the same or similar to as described above with respect to steps 416). For example, the synchronization relays the second device 504's presence-related update (e.g., of 534) to subscribed devices (e.g., 502 and/or 504) (e.g., which can include or exclude second device 504 depending on how distribution of such messages is implemented).

At step 538, the first device 502 synchronizes with the storage resource 506 (e.g., the same or similar to as described above with respect to steps 412, 420, and/or 426). For example, first device 502 continues synchronizing with the storage resource 506 after the second device 504 leaves the group activity session. In some examples, the first device 502 ceases to synchronize with the second device 504 in response to the second device 504 leaving (e.g., via the second data channel, and/or via the first data channel). In some examples, the synchronization rate between the first device 502 and the storage resource 506 changes in response to the second device 504 leaving the activity session and/or the activity session ending. That is, the group activity session can end and the first device 502 can return to editing the file corresponding to the data object and synchronizing with the persistent copy in the storage resource 506 relatively infrequently (e.g., once per minute over the first data channel).

As should be appreciated from the discussion above with respect to at least FIG. 5, different synchronization rates can be used between different sets of entities, regardless of whether one or multiple data channels are used. Further, each of these synchronization rates can be affected by the activity state of one or more devices in the group activity session. Thus, a change in activity state can result in an increase to the synchronization rate between first device 502 and other devices (e.g., second device 504) that are in the group activity session. The same change and/or increase can cause a decrease in the synchronization rate between the first device 502 and the storage resource 506 (e.g., or they could both increase, both decrease, one stay the same, and/or any other combination). As should be further appreciated, the addition and/or removal of devices from the group activity session can also cause the aforementioned changes in synchronization rate(s). For example, a third device (e.g., 324) joining the group activity session could cause an increase in the synchronization rate that the first device (e.g., 502, 320) uses to synchronize with other devices (the third device and the second device), while a fourth device (e.g., 326) joining could cause the synchronization rate to be further increased (e.g., when four devices are present).

In some examples, one or more of the steps, processes, operations, and/or actions described with respect to FIGS. 3 to 5 can be performed by a computer system (e.g., one more electronic device or system, such as compute system 100, device 200, and/or synchronization servers 312/408/508) that manages synchronization (e.g., a central computer system, such as one or more synchronization server). This computer system can also be referred to as a "synchronization manager". For instance, in some of the examples described above, reference is made to a device (e.g., first device) receiving an indication of an activity state (e.g., of another device) and changing a synchronization rate that the device uses. However, this disclosure is intended to cover scenarios in which one or both of these steps are performed by a synchronization manager, such as a synchronization server. In such an implementation, the synchronization server can optionally receive indications of each device's activity state in the group activity session, optionally determine appropriate respective synchronization rates applicable to each device (e.g., for synchronizing with each other and/or with a storage resource), optionally establish (or cause to be established (e.g., coordinate creation of)) a new data channel (e.g., second data channel) for synchronization between devices, and/or optionally cause the devices to use the determined synchronization rates (e.g., which can change as activity states change and/or number of the devices in the group activity session changes). In some examples, the synchronization manager can harmonize updates from multiple devices (e.g., resolve conflicts and combine change into a single updated copy). Harmonize can mean to combine, converge, merge, or otherwise put together multiple sources of data (e.g., updates from different devices) into one version. In some embodiments, the updates and/or the data object are formatted as data structures that can converge. In some examples, the synchronization manager communicates directly with each device in the activity session and manages transmitting updates to other devices and/or updating a persistent storage copy (e.g., stored at a storage resource).

In some examples, multiple devices in a group activity session are associated with the same user (e.g., user account). For example, referring back to FIG. 3, there are four devices that are part of the group activity session, and both the second device 322 and the third device 324 are associated with the same user, User B. In this example, User B is joined to the group activity session with their laptop computer (second device 322) and their smartphone (third device 324). In some examples, multiple devices associated with the same user present in a group session can synchronize (e.g., with other devices, with a storage resource) at different synchronization rates. In some examples, a synchronization rate of each device associated with the same user is based at least in part on the activity state of the respective device. For example, even though User B is interacting with the data object using both their laptop and their smartphone, they can be interacting at a greater level using the laptop computer (second device 322) than on their smartphone (third device 324)—this can cause laptop computer (second device 322) to synchronize with other devices (e.g., first device 320 and/or fourth device 326) at a greater rate than the other devices synchronize with the smartphone (third device 324). In a sense, the laptop computer in such example is the primary device being used by User B and as a result, synchronization to and/or from smartphone can be more infrequent. In some examples, characteristics of the device affects a synchronization rate associated therewith. For example, a device with a larger form factor and/or display capabilities can be caused to synchronize faster (e.g., because more content can be displayed simultaneously, and thus edited at any given moment). In some examples, synchronization rates between sets of devices (e.g., between the first device and the second device; between the first device and the third device) are negotiated, set, and/or known by both devices. In some examples, synchronization rates between sets of devices (e.g., between the first device and the second device; between the first device and the third device) are set by how often one device is configured to transmit updates. For example, where updates are pushed to synchronization server and multicast to all subscribers, the rate at which the first device receives synchronization updates from the second device is a synchronization rate which can be the same or different from the synchronization rate at which the second device receives synchronization updates from the first device. Thus, synchronization rate from the second electronic device to the first electronic device is set by the second electronic device's rate of transmitting updates, and synchronization rate from the first electronic device to the second electronic device is set by the first electronic device's rate of transmitting updates. In such a scenario, there can be two synchronization rates that exist between a pair of devices, where one synchronization rate is controlled by a rate at which the first device transmits updates, and the other synchronization rate is controlled by the rate at which the second device transmits updates (e.g., both corresponding to a write frequency of each device).

Consequently, if a primary device of multiple devices being used by a user leaves the group activity session, a remaining device associated with the user can, in response, have its synchronization rate changed (e.g., increased). In such example, if the laptop computer subsequently rejoins, it does not necessarily regain the higher synchronization rate immediately and/or automatically, in accordance with some examples.

Figure 6:
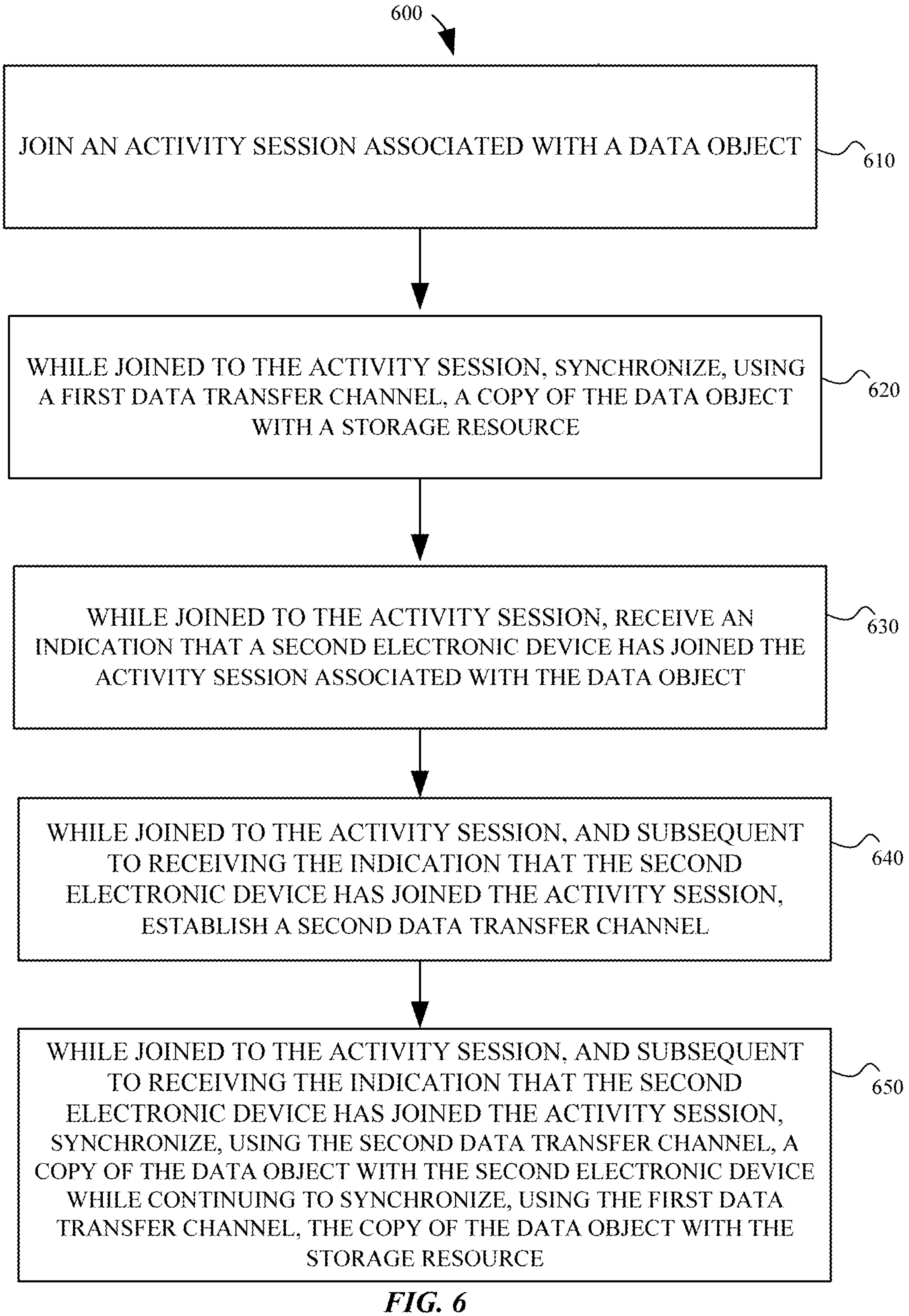
FIG. 6 is a flow diagram illustrating a method for synchronizing copies of a data object in accordance with some examples.

FIG. 6 is a flow diagram illustrating a method (e.g., method 600) for establishing a data channel for synchronization in accordance with some examples. Some operations in method 600 are, optionally, combined, the orders of some operations are, optionally, changed, and some operations are, optionally, omitted.

As described below, method 600 provides an intuitive way for establishing a data channel for synchronization. Method 600 provides an efficient manner for enabling real-time collaboration, thereby extending the functionality of computing devices. For battery-operated computing devices, enabling establishment of a data channel for synchronization faster and more efficiently conserves power and increases the time between battery charges.

In some examples, method 600 is performed by a first electronic device (e.g., a phone, a tablet, a wearable device, and/or a personal computer) (e.g., 100, 200, 320, 402, and/or 502).

At 610, the first electronic device joins an activity session (e.g., a unique session associated with a document accessible to multiple users) associated with a data object (e.g., saved file stored on a remote device (e.g., in the cloud)). In some examples, joining the activity session includes viewing and/or opening the data object.

At 620, while joined to the activity session (e.g., while viewing, editing, displaying, and/or before closing the data object), the first electronic device synchronizes (e.g., 412), using a first data transfer channel (e.g., periodically to remote (e.g., cloud) storage, "non-real-time" channel), a copy of the data object with a storage resource (e.g., a remote resource) (e.g., with a persistent (e.g., cloud) storage repository copy).

At 630, while joined to the activity session (e.g., while viewing, editing, displaying, and/or before closing the data object), the first electronic device receives an indication (e.g., notification from push server or another device) (e.g., 416) that a second electronic device (e.g., associated with the same or a different user) (e.g., 100, 200, 322, 404, and/or 504) has joined the activity session associated with the data object. In some examples, the second electronic device joining the activity session includes the second electronic device viewing and/or opening the data object. In some examples, the second electronic device joining the activity session includes the second electronic device executing (e.g., opening and/or causing display of) an application corresponding to the data object (e.g., the application is configured to view and/or open the data object).

At 640, while joined to the activity session (e.g., while viewing, editing, displaying, and/or before closing the data object), subsequent to (e.g., in response to) receiving the indication that the second electronic device has joined the activity session, the first electronic device establishes a second data transfer channel (e.g., a channel (e.g., "a real-time" channel) for synchronizing (e.g., directly) with the second electronic device and/or other devices instead of syncing with the storage resource). In some examples, the second data transfer channel does not synchronize a copy of the data object with the storage resource. In some examples, the second data transfer channel is different from the first data transfer channel. In some examples, the second data transfer channel is the same as the first data transfer channel though another device forwards a copy of the data object to a different location than with respect to the first data transfer channel.

At 650, while joined to the activity session (e.g., while viewing, editing, displaying, and/or before closing the data object), subsequent to (e.g., in response to) receiving the indication that the second electronic device has joined the activity session, the first electronic device synchronizes (e.g., 418), using the second data transfer channel, a copy of the data object with the second electronic device while continuing to synchronize (e.g., 420), using the first data transfer channel, the copy of the data object with the storage resource (e.g., the first electronic device performs ongoing and periodic synchronization using the two channels). In some examples, synchronizing using the second data transfer channel occurs subsequent to (e.g., in response to) receiving the indication that the second electronic device has joined the activity session. In some examples, the copy of the data object synchronized using the second data transfer channel is the same copy of the data object synchronized using the first data transfer channel. In some examples, the first electronic device harmonizes changes from the first electronic device and the second electronic device and synchronizes a harmonized copy of the data object with the storage resource.

In some examples, the first electronic device receives an indication that the second electronic device is editing (e.g., adding, removing, and/or modifying content of) the data object, wherein establishing the second data transfer channel is performed in response to receiving the indication that the second electronic device is editing the data object. In some examples, the indication that the second device is editing the data object is receiving in conjunction with the indication (e.g., 416) that the second electronic device has joined the activity session. In some examples, the indication that the second electronic device is editing the data object is received after the second electronic device has joined the activity session (e.g., per 524) such that the second data transfer channel is not established in response to receiving the indication that the second electronic device has joined the activity session but rather in response to receiving the indication that the second electronic device is editing the data object.

In some examples, subsequent to (e.g., in response to) receiving the indication that the second electronic device has joined the activity session, and prior to receiving the indication that the second electronic device is editing the data object, the first electronic device increases a synchronization rate of synchronization using the first data transfer channel. In some examples, subsequent to (e.g., in response to) receiving the indication that the second electronic device has joined the activity session, and after (e.g., in response to) receiving the indication that the second electronic device is editing the data object (e.g., after increasing the synchronization rate of synchronization using the first data transfer channel), the first electronic device decreases the synchronization rate of synchronization using the first data transfer channel.

In some examples, subsequent (e.g., in response) to establishing the second data transfer channel, and while the second data transfer channel is established (e.g., active, open, usable, and/or being used), the first electronic device decreases a synchronization rate of synchronization using the first data transfer channel. In some examples, after decreasing the synchronization rate of synchronization using the first data transfer channel, and after (e.g., in response) determining that the second data transfer channel has (e.g., or is being) terminated, the first electronic device increases the synchronization rate of synchronization using the first data transfer channel.

In some examples, subsequent to establishing the second data transfer channel, and while the second data transfer channel is established (e.g., active, open, usable, and/or being used), the first electronic device synchronizes, using the second data transfer channel, a copy of the data object with the second electronic device at a first synchronization rate. In some examples, subsequent to establishing the second data transfer channel, and while the second data transfer channel is established, the first electronic device synchronizes, using the first data transfer channel, the copy of the data object with the storage resource at a second synchronization rate, wherein the first synchronization rate is different from (e.g., greater than (e.g., more frequent; higher speed) or less than (e.g., less frequent; lower speed)) the second synchronization rate.

In some examples, subsequent to establishing the second data transfer channel, and in accordance with a determination (e.g., based on one or more received indications, messages, or the like) that no other electronic devices (e.g., the second electronic device, and/or any other device different than the first electronic device) are active in the activity session (e.g., have left the activity session, have become inactive due to inactivity by a user of the device, or the like), the first electronic device closes (e.g., ending, terminating, ceasing to use, or the like) the second data transfer channel.

In some examples, the storage resource is remote from the first electronic device and from the second electronic device.

Note that details of the processes described above with respect to method 600 (e.g., FIG. 6) are also applicable in an analogous manner to the methods described herein. For example, methods 700, 800, and/or 900 optionally includes one or more of the characteristics of the various methods described above with reference to method 600. For example, the first electronic device can establish a second data channel and update synchronization rates for existing synchronization subsequent to (e.g., in response to) a device joining a group activity session. For brevity, these details are not repeated below.

Figure 7:
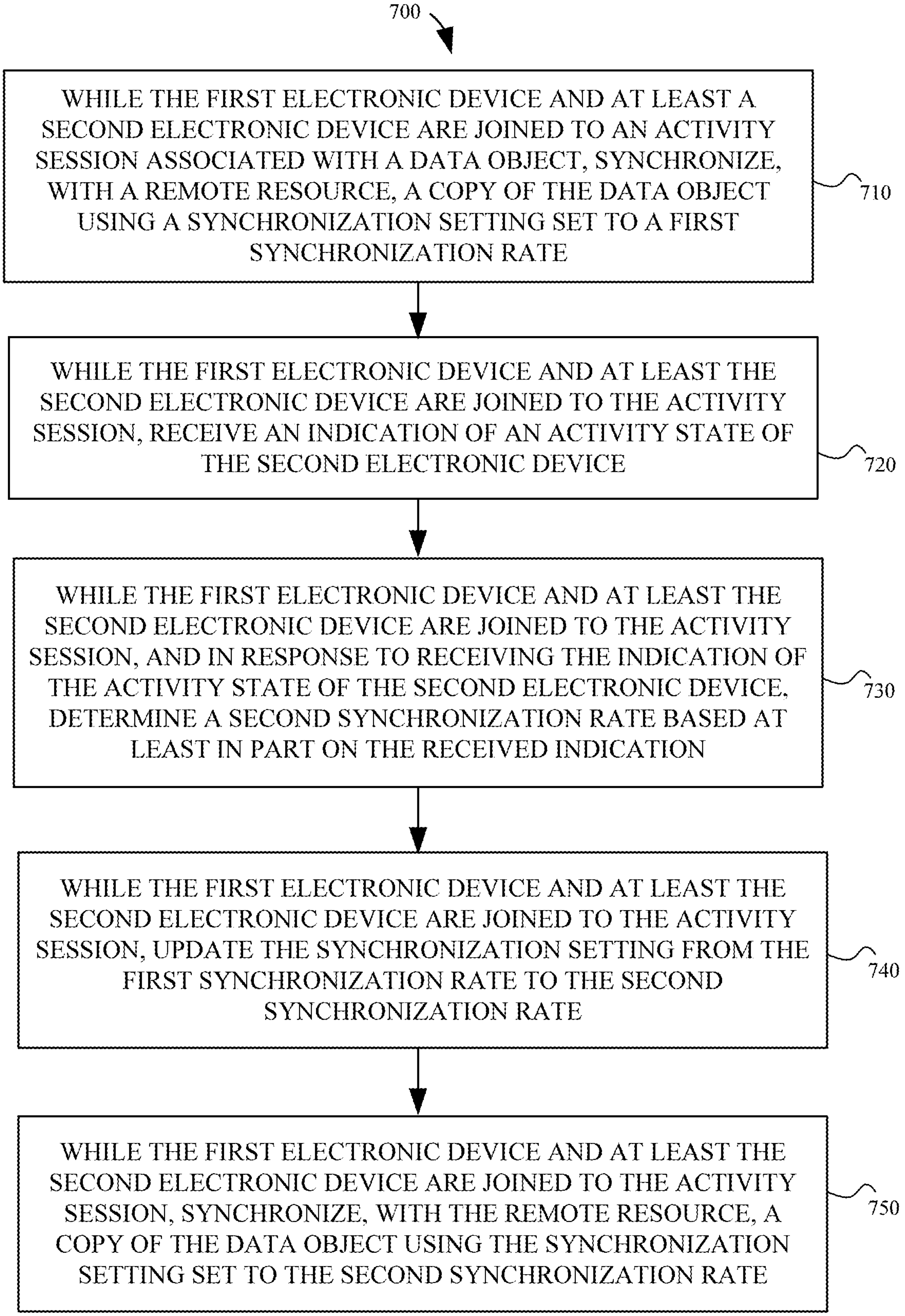
FIG. 7 is a flow diagram illustrating a method for synchronizing copies of a data object in accordance with some examples.

FIG. 7 is a flow diagram illustrating a method (e.g., method 700) for updating a synchronization rate in accordance with some examples. Some operations in method 700 are, optionally, combined, the orders of some operations are, optionally, changed, and some operations are, optionally, omitted.

As described below, method 700 provides an intuitive way for updating a synchronization rate. Method 700 600 provides an efficient manner for enabling real-time collaboration, thereby extending the functionality of computing devices. For battery-operated computing devices, enabling establishment of a data channel for synchronization faster and more efficiently conserves power and increases the time between battery charges.

In some examples, method 700 is performed by a first electronic device (e.g., a phone, a tablet, a wearable device, and/or a personal computer) (e.g., 100, 200, 320, 402, and/or 502).

At 710, while the first electronic device and at least a second electronic device (e.g., 100, 200, 320, 404, and/or 504) are joined to an activity session (e.g., a unique session associated with a document accessible to multiple users) associated with a data object (e.g., 316) (e.g., saved file stored in the cloud), the first electronic device synchronizes, with a remote resource (e.g., 100, 200, 314, 406, and/or 506) (e.g., a storage resource or another device (e.g., the second electronic device)), a copy of the data object using a synchronization setting set to a first synchronization rate (e.g., once per second). In some examples, being joined to an activity session can mean one or more of: opening a copy of the data object (e.g., a file associated therewith), viewing a copy of the data object, editing a copy of the data object, engaging in a threshold amount of interaction with a copy of the data object (e.g., while it is opened by the respective device), displaying a copy of the data object, opening or accessing an application associated with a copy of the data object (e.g., opening a word processing application used for editing a text file represented by the data object). For example, there can be different criteria for determining if a device is joined, which can vary based on implementation—in some implementations user interaction within a document copy is required (e.g., editing), and in other implementations simply having the document open is sufficient to be joined.

At 720, while the first electronic device and at least the second electronic device are joined to an activity session (e.g., the unique session associated with the document accessible to multiple users) associated with the data object (e.g., saved file stored in the cloud), the first electronic device receives an indication (e.g., 516) (e.g., a notification from a server (e.g., 100, 200, 312, 408, and/or 508) or another device (e.g., the second electronic device)) of an activity state (e.g., current level of interaction with the data object (e.g., is the user reading, editing), device/idle state (e.g., application suspend state, device lock state), connectivity state (e.g., fast connection, slow connection)) of the second electronic device. In some examples, the indication of the activity state represents a change to a previously received activity state (e.g., is an update or replacement to prior received data).

At 730, while the first electronic device and at least the second electronic device are joined to an activity session (e.g., the unique session associated with the document accessible to multiple users) associated with the data object (e.g., saved file stored in the cloud), in response to receiving the indication of the activity state of the second electronic device, the first electronic device determines a second synchronization rate based at least in part on the received indication of the activity state of the second electronic device, wherein the second synchronization rate is different from the first synchronization rate.

At 740, while the first electronic device and at least the second electronic device are joined to an activity session (e.g., the unique session associated with the document accessible to multiple users) associated with the data object (e.g., saved file stored in the cloud), the first electronic device updates the synchronization setting from the first synchronization rate to the second synchronization rate.

At 750, while the first electronic device and at least the second electronic device are joined to an activity session (e.g., the unique session associated with the document accessible to multiple users) associated with the data object (e.g., saved file stored in the cloud), the first electronic device synchronizes (e.g., 520), with the remote resource, a copy of the data object (e.g., 316) using the synchronization setting set to the second synchronization rate.

In some examples, the remote resource is the second electronic device (e.g., the second electronic device includes the remote resource).

In some examples, the remote resource is a storage resource different from the first electronic device and the second electronic device.

In some examples, the activity state of the second electronic device represents one or more of: a length (e.g., time) of interaction with the data object (e.g., a representation of the data object) by the second electronic device; a level (e.g., amount) of interaction (e.g., a number of portions updated) with the data object by the second electronic device; a type of device (e.g., form factor) of the second electronic device; a connection quality of the second electronic device (e.g., network condition, bandwidth, average upload/download speed, maximum upload/download speed, error rate, or the like); a user account associated with (e.g., logged into) the second electronic device; a number of devices in the activity session associated with the user account associated with the second electronic device; an application state (e.g., active, inactive/idle, currently interacting, and/or at a particular user interface) on the second electronic device; and a type of interaction (e.g., editing or viewing) with the data object.

In some examples, the first electronic device receives an indication (e.g., a notification from a server or another device (e.g., the second electronic device)) of a change to the activity state (e.g., current level of interaction with the data object (e.g., is the user reading, editing), device/idle state (e.g., application suspend state, device lock state), connectivity state (e.g., fast connection, slow connection)) of the second electronic device. In some examples, the indication of the activity state represents a change to a previously received activity state (e.g., is an update (e.g., 524) or replacement to prior received data). In some examples, the first electronic device receives an indication (e.g., a notification from a server or another device (e.g., the second electronic device)) of a change to the activity state (e.g., current level of interaction with the data object (e.g., is the user reading, editing), device/idle state (e.g., application suspend state, device lock state), connectivity state (e.g., fast connection, slow connection)) of the second electronic device. In some examples, the indication of the activity state represents a change to a previously received activity state (e.g., is an update or replacement to prior received data). In some examples, in response to receiving the indication of the change to the activity state of the second electronic device, the first electronic device determines a third synchronization rate based at least in part on the received indication of the change to the activity state of the second electronic device, wherein the third synchronization rate is different from the second synchronization rate. In some examples, in response to receiving the indication of the change to the activity state of the second electronic device, the first electronic device determines a third synchronization rate based at least in part on the received indication of the change to the activity state of the second electronic device, wherein the third synchronization rate is different from the second synchronization rate. In some examples, the first electronic device updates the synchronization setting from the second synchronization rate to the third synchronization rate. In some examples, the first electronic device updates the synchronization setting from the second synchronization rate to the third synchronization rate. In some examples, the first electronic device synchronizes, with the remote resource, a copy of the data object using the synchronization setting set to the third synchronization rate. In some examples, the first electronic device synchronizes, with the remote resource, a copy of the data object using the synchronization setting set to the third synchronization rate.

In some examples, while the first electronic device and the at least the second electronic device are joined to the activity session associated with a data object, the first electronic device receives an indication (e.g., notification from push server or another device) that one or more other electronic devices (e.g., 324 and/or 326) (e.g., associated with the same or a different user), different from the first electronic device and the at least the second electronic device, has joined the activity session associated with the data object. In some examples, the first electronic device receives an indication (e.g., notification from push server or another device) that one or more other electronic devices (e.g., associated with the same or a different user), different from the first electronic device and the at least the second electronic device, has joined the activity session associated with the data object (e.g., similar to at 516). In some examples, in response to receiving the indication of the one or more other electronic devices has joined the activity session associated with the data object, the first electronic device determines a fourth synchronization rate, wherein the fourth synchronization rate is different from the second synchronization rate. In some examples, in response to receiving the indication of the one or more other electronic devices has joined the activity session associated with the data object, the first electronic device determines a fourth synchronization rate, wherein the fourth synchronization rate is different from the second synchronization rate. In some examples, the first electronic device updates the synchronization setting from the second synchronization rate to the fourth synchronization rate. In some examples, the first electronic device updates the synchronization setting from the second synchronization rate to the fourth synchronization rate. In some examples, the first electronic device synchronizes, with the remote resource, a copy of the data object using the synchronization setting set to the fourth synchronization rate. In some examples, the first electronic device synchronizes, with the remote resource, a copy of the data object using the synchronization setting set to the fourth synchronization rate.

In some examples, updating a synchronization rate of synchronization includes one or more of: increasing a write frequency for synchronization, increasing a read frequency for synchronization, decreasing a write frequency for synchronization, and decreasing a read frequency for synchronization.

In some examples, updating a synchronization rate of synchronization includes: increasing a write frequency for synchronization using a first data channel (e.g., directly between two electronic devices) (e.g., 526); and decreasing a write frequency for synchronization using a second data channel (e.g., with a cloud storage copy) (e.g., 530).

In some examples, in accordance with a determination (e.g., based on one or more received indications, messages, or the like) that no other electronic devices (e.g., the second electronic device, and/or any other device different than the first electronic device) are active in the activity session (e.g., have left the activity session, have become inactive due to inactivity by a user of the device, or the like), the first electronic device updates the synchronization setting to the first synchronization rate (e.g., revert back to the original synchronization rate). In some examples, in accordance with a determination (e.g., based on one or more received indications, messages, or the like) that no other electronic devices (e.g., the second electronic device, and/or any other device different than the first electronic device) are active in the activity session (e.g., have left the activity session, have become inactive due to inactivity by a user of the device, or the like), the first electronic device updates the synchronization setting to the first synchronization rate (e.g., revert back to the original synchronization rate).

Note that details of the processes described above with respect to method 700 (e.g., FIG. 7) are also applicable in an analogous manner to the methods described herein. For example, methods 600, 800, and/or 900 optionally includes one or more of the characteristics of the various methods described above with reference to method 700. For example, the first electronic device can establish a second data channel and update synchronization rates for existing synchronization subsequent to (e.g., in response to) a device joining a group activity session. For brevity, these details are not repeated below.

Figure 8:
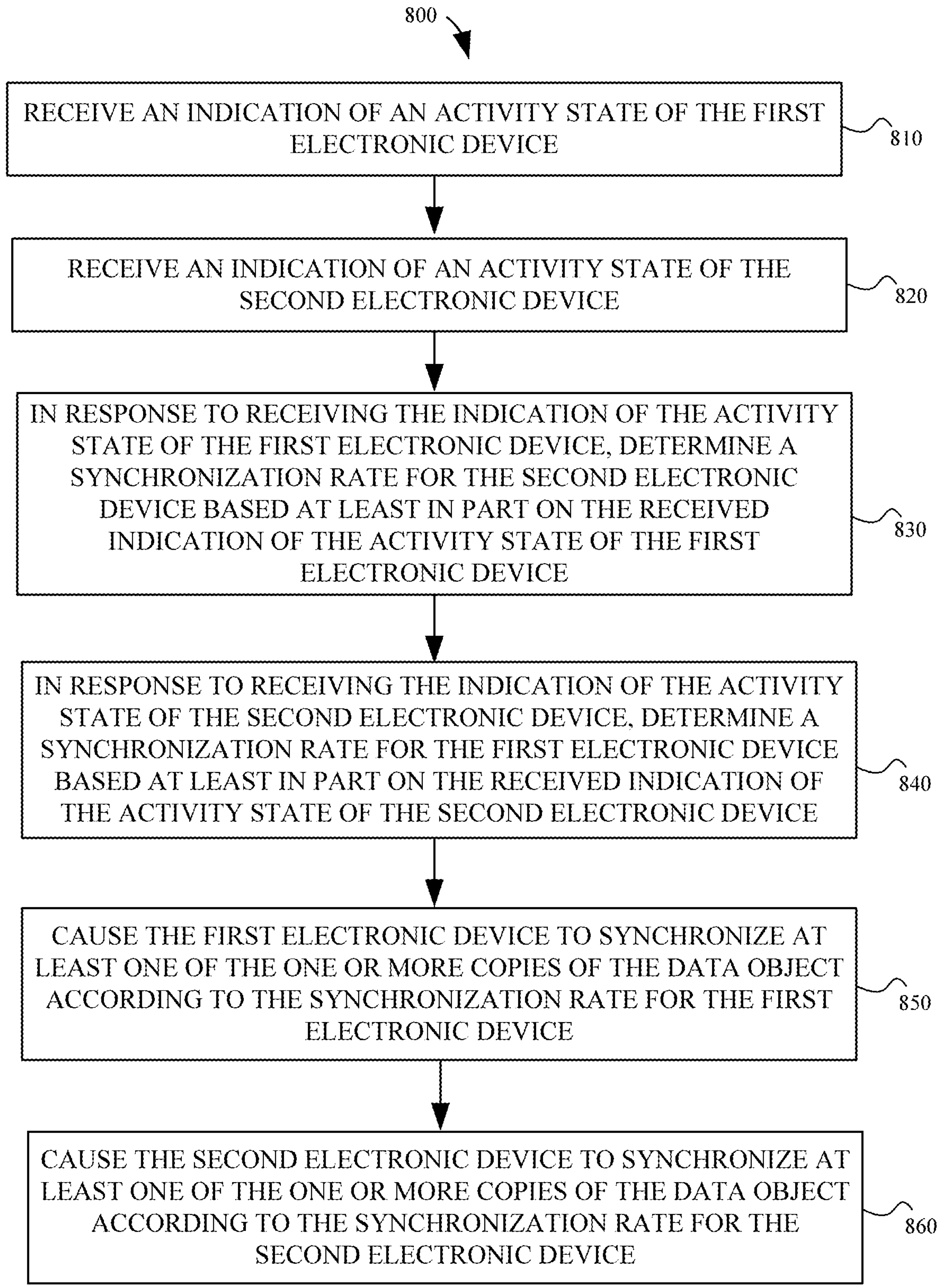
FIG. 8 is a flow diagram illustrating a method for synchronizing copies of a data object in accordance with some examples.

FIG. 8 is a flow diagram illustrating a method (e.g., method 800) for managing synchronization one or more copies of a data object in accordance with some examples. Some operations in method 800 are, optionally, combined, the orders of some operations are, optionally, changed, and some operations are, optionally, omitted.

As described below, method 800 provides an intuitive way for managing synchronization one or more copies of a data object. Method 800 provides an efficient manner for enabling real-time collaboration, thereby extending the functionality of computing devices. For battery-operated computing devices, enabling establishment of a data channel for synchronization faster and more efficiently conserves power and increases the time between battery charges.

In some examples, method 800 is performed by a computer system (e.g., one or more servers) (e.g., 100, 200, 312, 408, and/or 508). In some examples, the computer system manages synchronization of one or more copies of a data object (e.g., working copies located on each device directly with each other, one or more working copies with a central repository (e.g., cloud storage), or some combination of both) during an activity session (e.g., a unique session associated with a document accessible to multiple users) associated with the data object (e.g., saved file stored in the cloud), wherein a first electronic device (e.g., 100, 200, 320, 402, and/or 502) and a second electronic device (e.g., 100, 200, 322, 404, and/or 504) are joined to the activity session.

At 810, managing the synchronization includes the computer system receiving an indication (e.g., a notification from a server or another device (e.g., the first electronic device)) of an activity state of the first electronic device.

At 820, managing the synchronization includes the computer system receiving an indication (e.g., a notification from a server or another device (e.g., the second electronic device)) of an activity state of the second electronic device.

At 83, managing the synchronization includes, in response to receiving the indication of the activity state of the first electronic device, the computer system determining a synchronization rate for the second electronic device based at least in part on the received indication of the activity state of the first electronic device.

At 840, managing the synchronization includes, in response to receiving the indication of the activity state of the second electronic device, the computer system determining a synchronization rate for the first electronic device based at least in part on the received indication of the activity state of the second electronic device.

At 850, managing the synchronization includes the computer system causing the first electronic device to synchronize at least one of the one or more copies of the data object according to the synchronization rate for the first electronic device.

At 860, managing the synchronization includes the computer system causing the second electronic device to synchronize at least one of the one or more copies of the data object according to the synchronization rate for the second electronic device.

In some examples, managing synchronization further includes the computer system coordinating with the first electronic device and the second electronic device to establish a data transfer channel for performing synchronization of at least one of the one or more copies of the data object between the first electronic device and the second electronic device. In some examples, this coordinating is performed in response to one or both the first and second electronic device's activity state meeting a set of criteria (e.g., active in document). In some examples, coordinating includes one or more of instructing each of the first and second electronic device to establish the data transfer channel, mediating (e.g., relaying) communication between the first and second electronic device for establishing the data transfer channel, and/or provisioning one or more communications resources (e.g., servers) that will support and/or perform functions for the data transfer channel.

In some examples, managing synchronization further includes: the computer system coordinating synchronization between the first electronic device and a storage resource, (e.g., central repository (e.g., persistent cloud copy)) different from the first and second electronic devices, that uses a first type of data channel (e.g., periodically to remote (e.g., cloud) storage, "non-real-time" channel); the computer system coordinating synchronization between the second electronic device and the storage resource that uses the first type of data channel (e.g., periodically to remote (e.g., cloud) storage, "non-real-time" channel); and the computer system coordinating synchronization between the first electronic device and the second electronic device that uses a second type of data channel (e.g., real-time data channel).

In some examples, managing synchronization further includes the computer system coordinating synchronization between the first electronic device, the second electronic device, and a storage resource, (e.g., central repository (e.g., persistent cloud copy)) different from the first and second electronic devices, that uses a third type of data channel (e.g., real-time data channel) (e.g., synchronization occurs through the server, which handles receiving/storing/transmitting updates of a copy of the data object in a central repository).

In some examples, managing synchronization further includes the computer system receiving a first requested change to the data object from the first electronic device; the computer system receiving a second requested change to the data object from the second electronic device; and the computer system combining the first and second requested changes into a copy of the data object at a storage resource. In some examples, harmonizing changes comprises making the changes compatible with each other (e.g., resolving conflicts that can exist between changes from different electronic devices).

In some examples, the activity state of an electronic device (e.g., the first and/or the second electronic device) represents one or more of: a length (e.g., time) of interaction with the data object (e.g., a representation of the data object) by the second electronic device; a level (e.g., amount) of interaction with the data object by the second electronic device; a type of device (e.g., form factor) of the second electronic device; a connection quality of the second electronic device; a user account associated with (e.g., logged into) the second electronic device; a number of devices in the activity session associated with the user account associated with the second electronic device; an application state on the second electronic device; and a type of interaction with the data object.

In some examples, managing synchronization further includes: the computer system receiving an indication (e.g., a notification from a server or another device (e.g., the first electronic device)) of an updated activity state of the first electronic device; the computer system receiving an indication (e.g., a notification from a server or another device (e.g., the second electronic device)) of an updated activity state of the second electronic device; in response to receiving the indication of the updated activity state of the first electronic device, the computer system determining an updated synchronization rate for the second electronic device based at least in part on the received indication of the updated activity state of the first electronic device; in response to receiving the indication of the updated activity state of the second electronic device, the computer system determining an updated synchronization rate for the first electronic device based at least in part on the received indication of the updated activity state of the second electronic device; the computer system causing the first electronic device to synchronize at least one of the one or more copies of the data object according to the updated synchronization rate for the first electronic device; and the computer system causing the second electronic device to synchronize at least one of the one or more copies of the data object according to the updated synchronization rate for the second electronic device.

In some examples, managing synchronization further includes: the computer system causing a change to a synchronization rate of an electronic device that is joined to the activity session (e.g., the first electronic device, the second electronic device, and/or another electronic device). In some examples, causing the change includes one or more of: increasing a write frequency for synchronization, increasing a read frequency for synchronization, decreasing a write frequency for synchronization, and decreasing a read frequency for synchronization.

Note that details of the processes described above with respect to method 800 (e.g., FIG. 8) are also applicable in an analogous manner to the methods described herein. For example, methods 600, 700, and/or 900 optionally includes one or more of the characteristics of the various methods described above with reference to method 800. For example, a computer system can manage establishing a data channel and updated synchronization rates for a group activity session. For brevity, these details are not repeated below.

Figure 9:
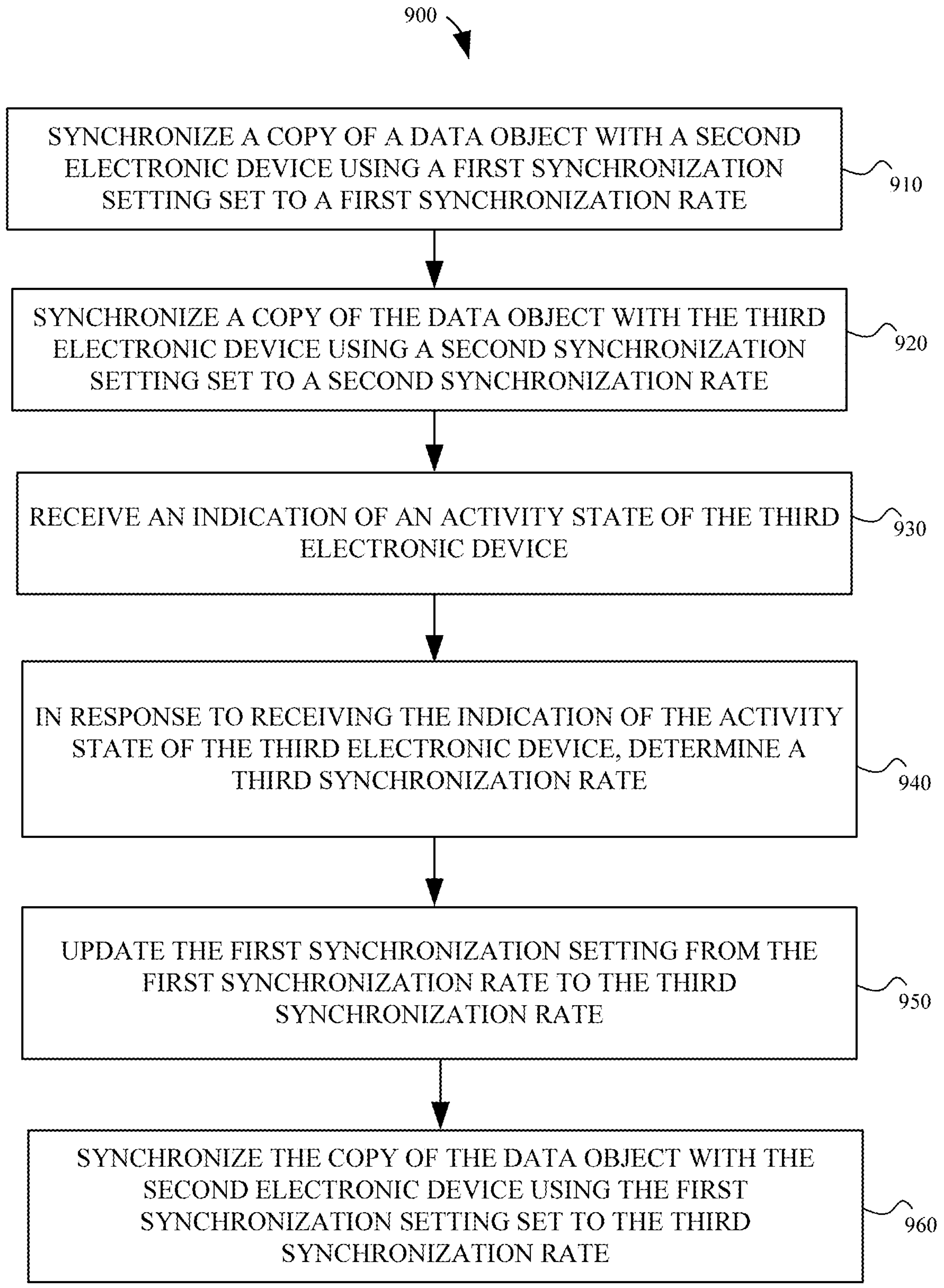
FIG. 9 is a flow diagram illustrating a method for synchronizing copies of a data object in accordance with some examples.

FIG. 9 is a flow diagram illustrating a method (e.g., method 900) for updating a synchronization rate in accordance with some examples. Some operations in method 900 are, optionally, combined, the orders of some operations are, optionally, changed, and some operations are, optionally, omitted.

As described below, method 900 provides an intuitive way for updating a synchronization rate. Method 900 provides an efficient manner for enabling real-time collaboration, thereby extending the functionality of computing devices. For battery-operated computing devices, enabling establishment of a data channel for synchronization faster and more efficiently conserves power and increases the time between battery charges.

In some examples, method 900 is performed by a first electronic device (e.g., a phone, a tablet, a wearable device, and/or a personal computer) (e.g., 100, 200, 320, 402, and/or 502).

At 910, while an activity session (e.g., a unique session associated with a document accessible to multiple users), associated with a data object (e.g., saved file stored in the cloud), includes the first electronic device associated with a first user (e.g., User A of FIG. 3), a second electronic device (e.g., 100, 200, 322, 404, and/or 504) associated with a second user (e.g., User B of FIG. 3), and a third electronic device (e.g., 324) associated with the second user, the first electronic device synchronizes a copy of the data object with the second electronic device using a first synchronization setting set to a first synchronization rate (e.g., once per second).

At 920, while the activity session, associated with the data object, includes the first electronic device associated with the first user, the second electronic device associated with the second user, and the third electronic device associated with the second user, the first electronic device synchronizes a copy of the data object with the third electronic device using a second synchronization setting set to a second synchronization rate (e.g., once per half second), wherein the second synchronization rate is higher than the first synchronization rate (e.g., the first device is synchronizing more often with the more active third device).

At 930, while the activity session, associated with the data object, includes the first electronic device associated with the first user, the second electronic device associated with the second user, and the third electronic device associated with the second user, the first electronic device receives an indication of an activity state of the third electronic device (e.g., the third electronic device drops from the session, due to exiting the session or becoming too idle).

At 940, while the activity session, associated with the data object, includes the first electronic device associated with the first user, the second electronic device associated with the second user, and the third electronic device associated with the second user, in response to receiving the indication of the activity state of the third electronic device, the first electronic device determines a third synchronization rate.

At 950, while the activity session, associated with the data object, includes the first electronic device associated with the first user, the second electronic device associated with the second user, and the third electronic device associated with the second user, the first electronic device updates the first synchronization setting from the first synchronization rate to the third synchronization rate.

At 960, while the activity session, associated with the data object, includes the first electronic device associated with the first user, the second electronic device associated with the second user, and the third electronic device associated with the second user, the first electronic device synchronizes the copy of the data object with the second electronic device using the first synchronization setting set to the third synchronization rate, wherein the third synchronization rate is higher than the first synchronization rate.

In some examples, the indication of the activity state of the third electronic device indicates that the third electronic device has a copy of the data object open (e.g., in an application) but is in an idle state (e.g., not currently interacting with and/or making changes to the copy of the data object (e.g., only viewing the copy of the data object); an application that has the copy of the data object open is idle (e.g., but the third electronic device is not necessarily idle); in a sleep state; in a hibernation state; in a standby state; or the like). In some examples, entering an idle state causes the third electronic device to leave the activity session associated with the data object.

In some examples, the indication of the activity state of the third electronic device indicates that the third electronic device has closed one or more of: a copy of the data object and an application associated with the data object. In some examples, closing a copy of the data object and/or closing an application associated with the data object causes the third electronic device to leave the activity session associated with the data object.

In some examples, the activity state of the second electronic device represents one or more of: a length (e.g., time) of interaction with the data object (e.g., a representation of the data object) by the second electronic device; a level (e.g., amount) of interaction with the data object by the second electronic device; a type of device (e.g., form factor) of the second electronic device; a connection quality of the second electronic device; a user account associated with (e.g., logged into) the second electronic device; a number of devices in the activity session associated with the user account associated with the second electronic device; an application state on the second electronic device; and a type of interaction with the data object.

In some examples, updating the first synchronization setting from the first synchronization rate to the third synchronization rate includes one or more of: increasing a write frequency for synchronization, increasing a read frequency for synchronization, decreasing a write frequency for synchronization, and decreasing a read frequency for synchronization.

In some examples, while the third electronic device is rejoined to the activity session associated with the data object: the first electronic device synchronizes a copy of the data object with the second electronic device using the first synchronization setting set to the third synchronization rate (e.g., once per half second). In some examples, the first electronic device synchronizes a copy of the data object with the third electronic device using the second synchronization setting set to a fourth synchronization rate (e.g., once per second), wherein the third synchronization rate is higher than the fourth synchronization rate (e.g., the first device is synchronizing more often with the second device, despite the third device rejoining).

Note that details of the processes described above with respect to method 900 (e.g., FIG. 9) are also applicable in an analogous manner to the methods described herein. For example, methods 600, 700, and/or 800 optionally includes one or more of the characteristics of the various methods described above with reference to method 900. For example, a synchronization rate for a second device can be updated based on activity by a third device. For brevity, these details are not repeated below.

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve how a device synchronizes with other devices and/or resources. The present disclosure contemplates that in some instances, this gathered data can include personal information data that uniquely identifies a user, that is private, or that can be used to determine user activity. Such personal information data can include demographic data, location-based data, telephone numbers, email addresses, home addresses, device activity, or any other identifying information.

The present disclosure recognizes that the use of such personal information data, in the present technology, can be used to the benefit of users. For example, the personal information data can be used to change how a device synchronizes with other devices and/or resources. Accordingly, use of such personal information data enables better synchronization processes. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of image capture, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, synchronization can be performed based on non-personal information data or a bare minimum amount of personal information, such as by anonymizing each device and/or user associated therewith and/or by preventing intermediaries (e.g., a server) from being able to view or have knowledge of data that is being exchanged between entities.

What is claimed is:

1. A method, comprising:

by a first electronic device:

receiving an indication that a second electronic device is interacting with a copy of a data object in a first manner, wherein the second electronic device is different from the first electronic device;

after receiving the indication that the second electronic device is interacting with the copy of the data object in the first manner, synchronizing, at a first rate of synchronization, the copy of the data object with the second electronic device;

while synchronizing, at the first rate of synchronization, the copy of the data object with the second electronic device, receiving an indication that the second electronic device is interacting with the copy of the data object in a second manner, wherein the second manner is different from the first manner; and in response to receiving the indication that the second electronic device is interacting with the copy of the data object in the second manner, synchronizing, at a second rate of synchronization different from the first rate of synchronization, the copy of the data object with the second electronic device.

2. The method of claim 1, wherein the copy of the data object is synchronized, at the first rate of synchronization, with the second electronic device in response to receiving the indication that the second electronic device is interacting with the copy of the data object in the first manner.

3. The method of claim 1, wherein the copy of the data object is synchronized, at the first rate of synchronization, with the second electronic device using a first data transfer channel, and wherein the copy of the data object is synchronized, at the second rate of synchronization, with the second electronic device using a second data transfer channel separate from the first data transfer channel.

4. The method of claim 3, further comprising:

after receiving the indication that the second electronic device is interacting with the copy of the data object in the second manner, maintaining establishment of the first data transfer channel while synchronizing, at the second rate of synchronization, the copy of the data object with the second electronic device.

5. The method of claim 4, further comprising:

in response to receiving the indication that the second electronic device is interacting with the copy of the data object in the second manner, reducing a rate of transfer for the first data transfer channel.

6. The method of claim 1, further comprising:

while synchronizing, at the second rate of synchronization, the copy of the data object with the second electronic device, detecting that the second electronic device has stopped interacting with the copy of the data object in the second manner; and in response to detecting that the second electronic device has stopped interacting with the copy of the data object in the second manner, synchronizing, at a third rate of synchronization different from the second rate of synchronization, the copy of the data object with the second electronic device.

7. The method of claim 6, wherein detecting that the second electronic device has stopped interacting with the copy of the data object in the second manner is based on receiving an indication that the second electronic device is no longer interacting with the copy of the data object in the second manner.

8. The method of claim 1, further comprising:

before receiving the indication that the second electronic device is interacting with the copy of the data object in the first manner, synchronizing, at a fourth rate of synchronization different from the first rate of synchronization and the second rate of synchronization, the copy of the data object with a storage resource separate from the first electronic device and the second electronic device.

9. The method of claim 8, wherein the copy of the data object is synchronized, at the first rate of synchronization, with the second electronic device through the storage resource.

10. The method of claim 8, wherein the copy of the data object is synchronized, at the second rate of synchronization, with the second electronic device without going through the storage resource.

11. A non-transitory computer-readable storage medium storing one or more programs configured to be executed by one or more processors of a first electronic device, the one or more programs including instructions for:

receiving an indication that a second electronic device is interacting with a copy of a data object in a first manner, wherein the second electronic device is different from the first electronic device;

after receiving the indication that the second electronic device is interacting with the copy of the data object in the first manner, synchronizing, at a first rate of synchronization, the copy of the data object with the second electronic device;

while synchronizing, at the first rate of synchronization, the copy of the data object with the second electronic device, receiving an indication that the second electronic device is interacting with the copy of the data object in a second manner, wherein the second manner is different from the first manner; and in response to receiving the indication that the second electronic device is interacting with the copy of the data object in the second manner, synchronizing, at a second rate of synchronization different from the first rate of synchronization, the copy of the data object with the second electronic device.

12. The non-transitory computer-readable medium of claim 11, wherein the copy of the data object is synchronized, at the first rate of synchronization, with the second electronic device in response to receiving the indication that the second electronic device is interacting with the copy of the data object in the first manner.

13. The non-transitory computer-readable medium of claim 11, wherein the copy of the data object is synchronized, at the first rate of synchronization, with the second electronic device using a first data transfer channel, and wherein the copy of the data object is synchronized, at the second rate of synchronization, with the second electronic device using a second data transfer channel separate from the first data transfer channel.

14. The non-transitory computer-readable medium of claim 13, the method further comprising:

after receiving the indication that the second electronic device is interacting with the copy of the data object in the second manner, maintaining establishment of the first data transfer channel while synchronizing, at the second rate of synchronization, the copy of the data object with the second electronic device.

15. The non-transitory computer-readable medium of claim 14, the method further comprising:

in response to receiving the indication that the second electronic device is interacting with the copy of the data object in the second manner, reducing a rate of transfer for the first data transfer channel.

16. The non-transitory computer-readable medium of claim 11, the method further comprising:

while synchronizing, at the second rate of synchronization, the copy of the data object with the second electronic device, detecting that the second electronic device has stopped interacting with the copy of the data object in the second manner; and in response to detecting that the second electronic device has stopped interacting with the copy of the data object in the second manner, synchronizing, at a third rate of synchronization different from the second rate of synchronization, the copy of the data object with the second electronic device.

17. The non-transitory computer-readable medium of claim 16, wherein detecting that the second electronic device has stopped interacting with the copy of the data object in the second manner is based on receiving an indication that the second electronic device is no longer interacting with the copy of the data object in the second manner.

18. The non-transitory computer-readable medium of claim 11, the method further comprising:

before receiving the indication that the second electronic device is interacting with the copy of the data object in the first manner, synchronizing, at a fourth rate of synchronization different from the first rate of synchronization and the second rate of synchronization, the copy of the data object with a storage resource separate from the first electronic device and the second electronic device.

19. The non-transitory computer-readable medium of claim 18, wherein the copy of the data object is synchronized, at the first rate of synchronization, with the second electronic device through the storage resource.

20. The non-transitory computer-readable medium of claim 18, wherein the copy of the data object is synchronized, at the second rate of synchronization, with the second electronic device without going through the storage resource.

21. A first electronic device comprising:

one or more processors; and memory storing one or more programs configured to be executed by the one or more processors, the one or more programs including instructions for:

receiving an indication that a second electronic device is interacting with a copy of a data object in a first manner, wherein the second electronic device is different from the first electronic device;

after receiving the indication that the second electronic device is interacting with the copy of the data object in the first manner, synchronizing, at a first rate of synchronization, the copy of the data object with the second electronic device;

while synchronizing, at the first rate of synchronization, the copy of the data object with the second electronic device, receiving an indication that the second electronic device is interacting with the copy of the data object in a second manner, wherein the second manner is different from the first manner; and in response to receiving the indication that the second electronic device is interacting with the copy of the data object in the second manner, synchronizing, at a second rate of synchronization different from the first rate of synchronization, the copy of the data object with the second electronic device.

22. The first electronic device of claim 21, wherein the copy of the data object is synchronized, at the first rate of synchronization, with the second electronic device in response to receiving the indication that the second electronic device is interacting with the copy of the data object in the first manner.

23. The first electronic device of claim 21, wherein the copy of the data object is synchronized, at the first rate of synchronization, with the second electronic device using a first data transfer channel, and wherein the copy of the data object is synchronized, at the second rate of synchronization, with the second electronic device using a second data transfer channel separate from the first data transfer channel.

24. The first electronic device of claim 23, the method further comprising:

after receiving the indication that the second electronic device is interacting with the copy of the data object in the second manner, maintaining establishment of the first data transfer channel while synchronizing, at the second rate of synchronization, the copy of the data object with the second electronic device.

25. The first electronic device of claim 24, the method further comprising:

in response to receiving the indication that the second electronic device is interacting with the copy of the data object in the second manner, reducing a rate of transfer for the first data transfer channel.

26. The first electronic device of claim 21, the method further comprising:

while synchronizing, at the second rate of synchronization, the copy of the data object with the second electronic device, detecting that the second electronic device has stopped interacting with the copy of the data object in the second manner; and in response to detecting that the second electronic device has stopped interacting with the copy of the data object in the second manner, synchronizing, at a third rate of synchronization different from the second rate of synchronization, the copy of the data object with the second electronic device.

27. The first electronic device of claim 26, wherein detecting that the second electronic device has stopped interacting with the copy of the data object in the second manner is based on receiving an indication that the second electronic device is no longer interacting with the copy of the data object in the second manner.

28. The first electronic device of claim 21, the method further comprising:

before receiving the indication that the second electronic device is interacting with the copy of the data object in the first manner, synchronizing, at a fourth rate of synchronization different from the first rate of synchronization and the second rate of synchronization, the copy of the data object with a storage resource separate from the first electronic device and the second electronic device.

29. The first electronic device of claim 28, wherein the copy of the data object is synchronized, at the first rate of synchronization, with the second electronic device through the storage resource.

30. The first electronic device of claim 28, wherein the copy of the data object is synchronized, at the second rate of synchronization, with the second electronic device without going through the storage resource.

* * * * *